US011579169B2

(12) United States Patent
Zhu et al.

(10) Patent No.: US 11,579,169 B2
(45) Date of Patent: Feb. 14, 2023

(54) SCANNING PROBE HAVING MICRO-TIP, METHOD AND APPARATUS FOR MANUFACTURING THE SAME

(71) Applicant: National Institute of Metrology, China, Beijing (CN)

(72) Inventors: Zhen-Dong Zhu, Beijing (CN); Si-Tian Gao, Beijing (CN); Wei Li, Beijing (CN)

(73) Assignee: NATIONAL INSTITUTE OF METROLOGY, CHINA, Beijing (CN)

( * ) Notice: Subject to any disclaimer, the term of this patent is extended or adjusted under 35 U.S.C. 154(b) by 0 days.

(21) Appl. No.: 17/478,900

(22) Filed: Sep. 18, 2021

(65) Prior Publication Data

US 2022/0003799 A1 Jan. 6, 2022

Related U.S. Application Data

(62) Division of application No. 16/583,229, filed on Sep. 25, 2019, now Pat. No. 11,156,636.

(30) Foreign Application Priority Data

Sep. 30, 2018 (CN) .......................... 201811161139.9
Sep. 30, 2018 (CN) .......................... 201811161314.4
(Continued)

(51) Int. Cl.
*G01Q 70/10* (2010.01)
*G01J 3/02* (2006.01)
(Continued)

(52) U.S. Cl.
CPC ............ *G01Q 70/10* (2013.01); *G01J 3/0208* (2013.01); *G01J 3/0224* (2013.01); *G01J 3/10* (2013.01);
(Continued)

(58) Field of Classification Search
CPC ....... G01Q 70/10; G01Q 70/16; G01J 3/0208; G01J 3/0224; G01J 3/10; G01J 3/14;
(Continued)

(56) References Cited

U.S. PATENT DOCUMENTS 5,394,500 A * 2/1995 Marchman ............. G02B 6/245
977/875
5,531,343 A * 7/1996 Filas ....................... H01J 9/025
216/49
(Continued)

FOREIGN PATENT DOCUMENTS

CN 1862308 A 11/2006
CN 101182992 A 5/2008
(Continued)

OTHER PUBLICATIONS

Zhu Sheng-xiang et al: "Study and Application of Novel Optical Fiber Probes", «Journal of Tongji University» , vol. 4, Apr. 30, 2002, pp. 516-521.
(Continued)

*Primary Examiner* — David A Vanore

(57) ABSTRACT

The present disclosure provides a scanning probe, a method and an apparatus for manufacturing the scanning probe. The scanning probe includes a base and a micro-tip disposed on an end of the base, wherein at least a section of the micro-tip comprises a lateral surface with a concavely curved generatrix. In the method, an end of a probe precursor is immersed in a corrosive solution by having a length direction of the probe precursor inclined with a liquid surface of the corrosive solution. The probe precursor is corroded by the corrosive solution while a corrosion current of the corroding is monitored. The probe precursor is moved away from the corrosive solution after a magnitude of the corrosion current has a plunge. The apparatus includes a container containing
(Continued)

the corrosive solution, and a driving device configured to move the probe precursor in the container through a fastener.

10 Claims, 13 Drawing Sheets

(30) Foreign Application Priority Data

| | | |
|---|---|---|
| Sep. 30, 2018 | (CN) | 201811161514.X |
| Sep. 30, 2018 | (CN) | 201811162987.1 |
| Sep. 30, 2018 | (CN) | 201811166846.7 |

(51) Int. Cl.
| | |
|---|---|
| *G01J 3/10* | (2006.01) |
| *G01J 3/14* | (2006.01) |
| *G01J 3/28* | (2006.01) |
| *G01J 3/44* | (2006.01) |
| *G01J 3/12* | (2006.01) |

(52) U.S. Cl.
CPC ............... *G01J 3/14* (2013.01); *G01J 3/2803* (2013.01); *G01J 3/2823* (2013.01); *G01J 3/4412* (2013.01); *G01J 2003/104* (2013.01); *G01J 2003/1213* (2013.01); *G01J 2003/2806* (2013.01)

(58) Field of Classification Search
CPC ...... G01J 3/2803; G01J 3/2823; G01J 3/4412; G01J 2003/104; G01J 2003/1213; G01J 2003/2806; G01J 3/44; G01J 3/36
See application file for complete search history.

(56) References Cited

U.S. PATENT DOCUMENTS

| | | | |
|---|---|---|---|
| 6,542,455 B1 | 4/2003 | Kuwahara et al. | |
| 8,966,661 B2 * | 2/2015 | Chang | B82Y 35/00 |
| | | | 850/57 |
| 10,060,862 B2 * | 8/2018 | Cui | G01Q 60/30 |
| 2012/0314206 A1 | 12/2012 | Spizig et al. | |
| 2014/0033374 A1 * | 1/2014 | Chang | G01Q 70/10 |
| | | | 850/57 |
| 2015/0253248 A1 | 9/2015 | Wickramasinghe | |
| 2020/0103438 A1 * | 4/2020 | Zhu | G01J 3/36 |

FOREIGN PATENT DOCUMENTS

| | | |
|---|---|---|
| CN | 101701352 A | 5/2010 |
| CN | 102483429 A | 5/2012 |
| CN | 102507002 A | 6/2012 |
| CN | 102586854 A | 7/2012 |
| CN | 102721832 A | 10/2012 |
| CN | 103014826 A | 4/2013 |
| CN | 103091299 A | 5/2013 |
| CN | 105527263 A | 4/2016 |
| CN | 107850621 A | 3/2018 |
| CN | 108169518 A | 6/2018 |
| CN | 108593625 A | 9/2018 |
| DE | 4007292 C1 | 6/1991 |
| WO | WO2018089022 A1 | 5/2018 |

OTHER PUBLICATIONS

Gao Si-tian et al: "Research on the Fabrication Method of High Length-to-width Ratio Tungsten Tip with a Step", «Acta Metrologiga Siniga» , Dec. 12, 2017, pp. 50-53.

Gui Qing-guo et al: "Preparation of STM Nanotips Based on Bottom Electrochemical Etching Method", «Journal of Southwest University(Natural Science Edition)» , vol. 05, May 20, 2011, pp. 12-14.

Wang Hai-long: "The study of electro-optical modulator based on surface plasmons and the evanescent field-excited surface plasmon-enhanced Raman", «Chinese Doctoral Dissertations & Master's Theses Full-text Database(Doctor) Information Science and technology» , vol. 9, Sep. 5, 2017, pp. 70-71.

* cited by examiner

SCANNING PROBE HAVING MICRO-TIP, METHOD AND APPARATUS FOR MANUFACTURING THE SAME

CROSS-REFERENCE TO RELATED APPLICATIONS

This application is a divisional of U.S. application Ser. No. 16/583,229, filed on Sep. 25, 2019, which claims all benefits accruing under 35 U.S.C. § 119 from China Patent Applications No. 201811161314.4, No. 201811161139.9, No. 201811161514.X, No. 201811166846.7, No. 201811162987.1, all filed on Sep. 30, 2018, in the China National Intellectual Property Administration, the contents of which are hereby incorporated by reference.

FIELD

The present disclosure relates to scanning probes, methods for manufacturing the same, and apparatus for manufacturing the same.

BACKGROUND

Traditional optical microscopy is difficult to apply in analysis and characterize in nanoscale, atomic-scale or molecular-scale under the quantum effect of the specimen. Scanning probe microscopy is more effective in these precision measurements, adopting a scanning probe with a micro-tip to interact with the surface of the specimen to obtain structural parameters and properties. The scanning probes can be used in atomic force microscopy (AFM), scanning tunneling microscopy (STM), near-field scanning optical microscopy (NSOM), tip-enhanced Raman spectroscopy (TERS), and so on, which are different types of the scanning probe microscopy or cooperation between the scanning probe microscopy and other measurement techniques. These microscope systems form a nanoscale interaction between light, micro-tip, and specimen, and achieve high-efficiency, high-stability, and high-resolution analysis and characterization of the specimen by extracting the interacting signals.

SUMMARY

What is needed therefore is to provide a scanning probe, a method for manufacturing the scanning probe, and an apparatus for manufacturing the scanning probe.

One aspect of the present disclosure provides a scanning probe, the scanning probe comprises a base and a micro-tip disposed on an end of the base, and at least a section of the micro-tip comprises a lateral surface with a concavely curved generatrix.

In an embodiment, the section of the micro-tip has a cone shape or a truncated cone shape, and the generatrix is a circular curve line, an elliptical curve line, a parabolic curve line, or an exponential curve line.

In an embodiment, the micro-tip comprises an apex and a tip body disposed between the base and the apex, the apex is located at a most distal end of the scanning probe, and the micro-tip has a first length direction extending from the tip body to the apex.

In an embodiment, a diameter of the apex is in a range from about 1 nm to about 5 nm, and a length of the micro-tip is in a range from about 1 μm to about 500 μm.

In an embodiment, the micro-tip has a stepped shape, the tip body comprises a distal section adjacent to the apex and a middle section between the distal section and the base, the middle section has a constant diameter, and the distal section has a tapered structure with a diameter gradually decreasing from the middle section to the apex.

In an embodiment, the micro-tip comprises diameter-changing sections, and the micro-tip comprises a converged lateral tip, a converged lateral edge, or a combination thereof disposed between the diameter-changing sections.

In an embodiment, the micro-tip comprises a curved section, a first straight section, and a second straight section, the curved section is joined between the first straight section and the second straight section, and the lateral surface of the micro-tip smoothly transforms from the first straight section to the second straight section through the curved section.

In an embodiment, an angle between the first length direction of the second straight section and the first length direction of the first straight section is in a range from about 30 degrees to 75 degrees.

In an embodiment, the micro-tip comprises a plurality of curved sections and a plurality of straight sections alternatively joined to one another and cooperatively forming a conic spiral structure, and the apex of the micro-tip is located at the center of the conic spiral structure.

Another aspect of the present disclosure provides a method for manufacturing the scanning probe, the method comprising:

S10, providing a probe precursor and a corrosive solution, the probe precursor having a second length direction, the corrosive solution is capable of corroding the probe precursor;

S20, immersing an end of the probe precursor in the corrosive solution by having the second length direction of the probe precursor inclined with a liquid surface of the corrosive solution;

S30, adjusting the probe precursor to have the second length direction of the probe precursor substantially perpendicular to the liquid surface of the corrosive solution;

S40, corroding the probe precursor by the corrosive solution while maintaining the probe precursor still and substantially perpendicular to the liquid surface and monitoring a corrosion current of the corroding; and S50, moving the probe precursor away from the corrosive solution after a magnitude of the corrosion current has a plunge thereby forming the micro-tip of the scanning probe;

wherein S20 to S50 proceed in a condition-stable environment.

In an embodiment, the condition-stable environment is an environment having a constant temperature and a constant humidity, the constant temperature is 20° C.±0.5° C., the constant humidity is a relative humidity which is greater than 70%.

In an embodiment, in S20, the end of the probe precursor is obliquely inserted into the corrosive solution.

In an embodiment, the corrosive solution is capable of being raised up from the liquid surface around the probe precursor and forming a liquid cone under an action of gravity.

In an embodiment, between S30 and S40, the method further comprises:

S32, corroding the probe precursor by the corrosive solution in a period of time while maintaining the probe precursor still and substantially perpendicular to the liquid surface; and S34, moving a section but not entire of the probe precursor out from the corrosive solution.

In an embodiment, after S50, the method further comprises:

S70, obliquely or horizontally aligning the probe precursor, and corroding the micro-tip by an additional corrosive solution.

In an embodiment, after S50, the method further comprises:

S80, obliquely or horizontally aligning the probe precursor, and irradiating the micro-tip with a laser beam thereby curving the micro-tip.

Another aspect of the present disclosure provides an apparatus for manufacturing a scanning probe, the apparatus comprises a container containing the corrosive solution, and a driving device comprising a fastener configured to fasten the probe precursor, the driving device is configured to move the probe precursor in the container through the fastener.

In an embodiment, the driving device further comprises a stepper motor and a piezoelectric ceramics connected with the stepper motor to cooperatively drive the fastener.

In an embodiment, the container is a U-shaped reactor having one end closed and another end opened through a hole, the hole is capable of allowing the probe precursor to enter and exit the container.

In an embodiment, the apparatus further comprises a circulating cooling device, a dryer, a temperature and humidity monitor, and a temperature and humidity controller.

The method and apparatus for manufacturing the scanning probe is convenient, fast, and low in cost. By monitoring the corrosion current during the corroding, and using the plunge of the corrosion current as a sign indicating the moving action, the moving step can proceed automatically and the shape of the scanning probe can be formed more accurately. The scanning probe has a tiny apex and a concavely curved lateral surface, which can be used in high-resolution analysis and characterization in a microscope system.

BRIEF DESCRIPTION OF THE DRAWINGS

Implementations are described by way of example only with reference to the attached figures.

DETAILED DESCRIPTION

A detailed description with the above drawings is made to further illustrate the present disclosure.

Figure 1:
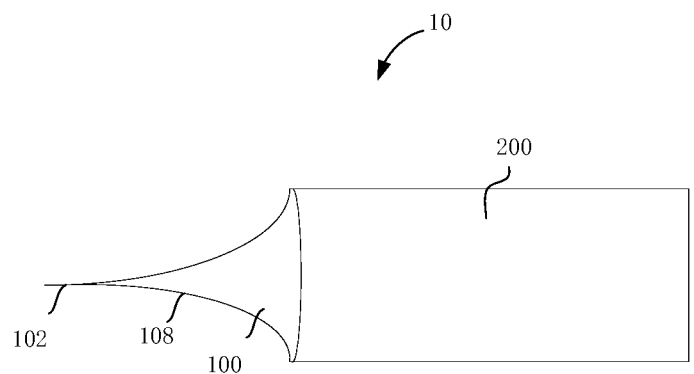
FIG. 1 is a schematic structural view of an embodiment of a scanning probe.

Referring to FIG. 1, an embodiment of a scanning probe 10 comprises a base 200 and a micro-tip disposed on an end of the base 200. At least a section of the micro-tip comprises a lateral surface with a concavely curved generatrix 108. The section of the micro-tip can have a cone shape or a truncated cone shape. The generatrix 108 can be a curve such as a circular, an elliptical, a parabolic, or an exponential curve.

The micro-tip comprises an apex 102 and a tip body 100 disposed between the base 200 and the apex 102. The apex 102 is located at a most distal end of the scanning probe 10. A diameter of the apex 102 can be relatively small, such as 1 nanometer (nm) to hundreds of nanometers. A length of the apex 102 can be about 1 nm to 2 nm. In a microscope system having the scanning probe 10, the apex 102 engages with a target to be observed and/or sensed, such as a sample or a specimen. The base 200 supports the micro-tip. The base 200 can have a rod or bar shape with a length that is capable of being mounted on a holding member of the microscope system.

In some embodiments, the length of the base 200 can be in a range from about 1 millimeter (mm) to about 1 centimeter (cm). In some embodiments, a diameter or a cross-sectional size of the base 200 can be in a range from about 200 micrometers (μm) to about 1000 μm. The base 200 can be a cantilever in some embodiments of the microscope system, such as an atomic force microscope, scanning tunneling microscope, near-field scanning optical microscope, tip-enhanced Raman spectroscope, and so on.

In an embodiment, the entire scanning probe 10 is an integrated structure. The micro-tip is directly protruded from the end of the base 200 along the length direction of the base 200. In another embodiment, the micro-tip and the base 200 can be separated members that are joined or connected together, however the entire micro-tip can be an integrated structure.

Figure 3:
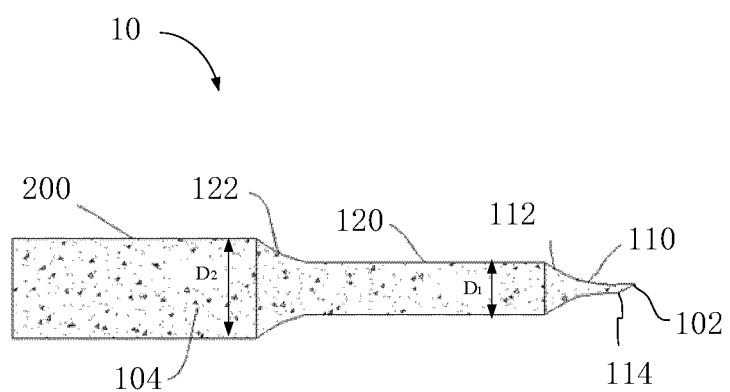
FIG. 3 is a schematic structural view of an embodiment of the scanning probe with a micro-tip having a stepped shape.
Figure 13:
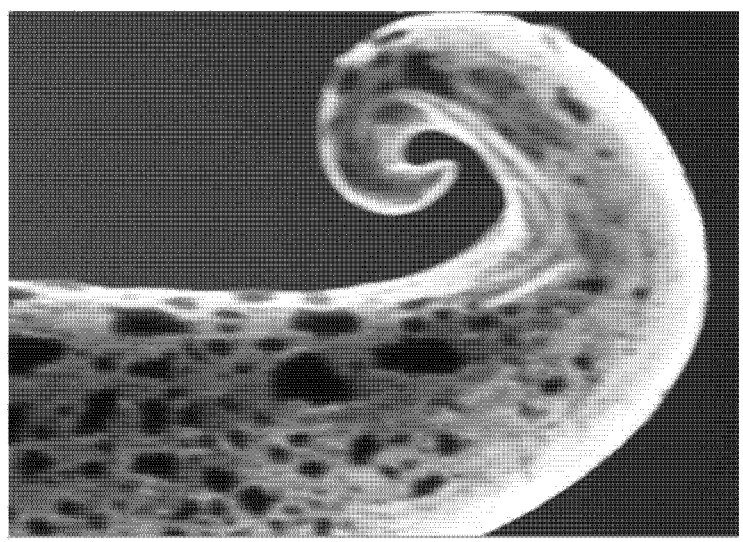
FIG. 13 shows an optical microscope image of another embodiment of the curved micro-tip of the scanning probe.
Figure 14:
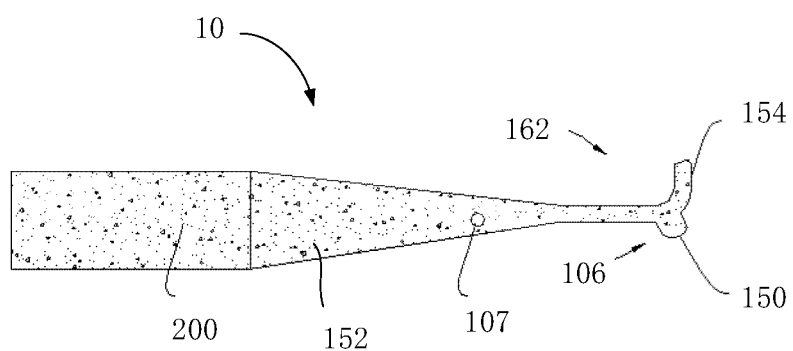
FIG. 14 is a schematic structural view of yet another embodiment of the scanning probe having the curved micro-tip.

A material of the scanning probe 10 or at least the micro-tip can be selected from the group consisting of gold, silver, platinum, tungsten, or optical fiber. The scanning probe 10 can further comprise a scattering layer coated on at least a section, such as the base 200, the tip body 100, and/or the apex 102, of the scanning probe 10. Referring to FIG. 3, FIG. 13, and FIG. 14, in some embodiment, the scattering layer 104 is coated on the entire surface of the scanning probe 10. The scattering layer 170 can enhance surface excitation resonance, thereby enhancing the Raman scattering. In an embodiment, the scattering layer 170 can be made of a precious metal, such as gold or silver.

The micro-tip can have a length direction from the tip body 100 to the apex 102. In some embodiments, the length direction can be an axial direction of the micro-tip. The length direction and/or the axial direction of the micro-tip can be a straight line, such as in the embodiments shown in FIG. 1 to FIG. 9, or a curved line, such as in the embodiments shown in FIG. 10 to FIG. 16. A length (L) of the micro-tip can be in a range from about 1 μm to about 500 μm, and in some embodiments, from about 50 μm to about 100 μm. The micro-tip can have a transverse size along a direction perpendicular to the length direction of the micro-tip. The transverse size is also called "diameter" in the following description, which can be a simplification, but not an implication that the micro-tip must always be a regular cylinder, cone or truncated cone in its entire length. The micro-tip can have different diameters at different locations in the length direction of the micro-tip. The diameter of the micro-tip can gradually decrease in general from the tip body 100 to the apex 102. However, the diameter of the micro-tip may not always decrease smoothly, and can be constant in a section of the micro-tip and/or increase in another section of the micro-tip. A diameter (d) of the apex 102 can be in a range from about 1 nm to about 5 nm, and in some embodiments, from about 1 nm to about 2 nm.

Figure 2:
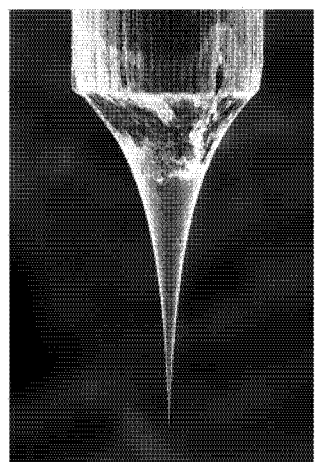
FIG. 2 shows an optical microscope image of an embodiment of a micro-tip of the scanning probe.

Referring to FIG. 1 and FIG. 2, in some embodiments, the micro-tip can have a tapered structure with the diameter gradually decreasing along the axial direction of the micro-tip from the tip body 100 to the apex 102. The axial direction of the micro-tip from the tip body 100 to the apex 102 can be a straight line. The entire micro-tip can be a cone comprising a lateral surface defined by the concavely curved generatrix 108. The generatrix 108 can be a curve such as a circular, an elliptical, a parabolic, or an exponential curve. The slope of a point on the lateral surface of the micro-tip increases from the tip body 100 to the apex 102.

Figure 4:
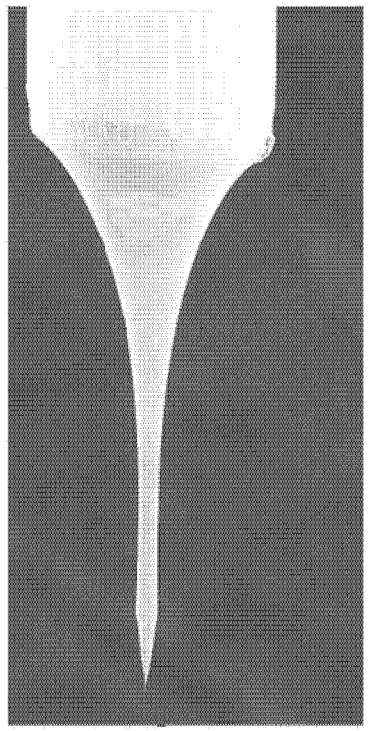
FIG. 4 shows an optical microscope image of an embodiment of the micro-tip having the stepped shape.
Figure 5:
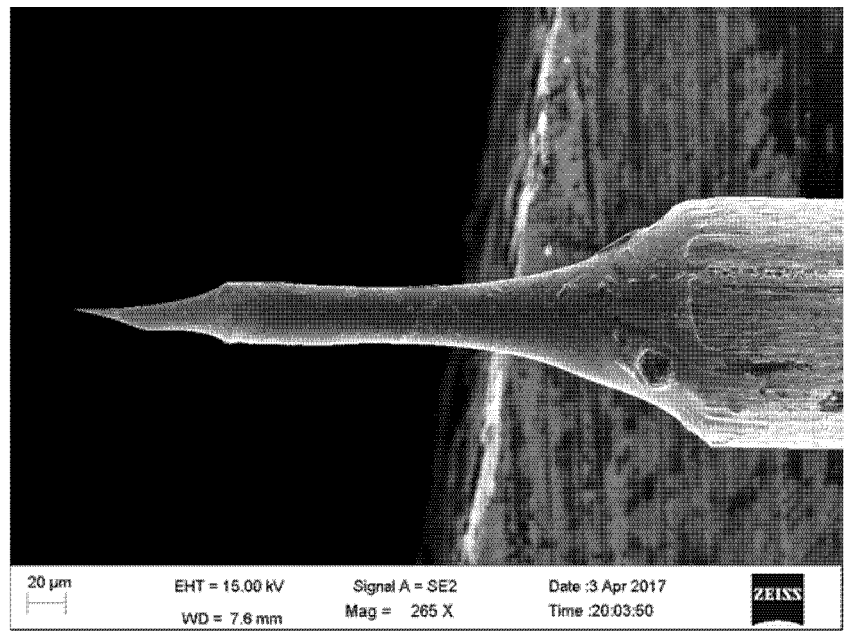
FIG. 5 shows an optical microscope image of another embodiment of the micro-tip having the stepped shape.

Referring to FIG. 3 to FIG. 5, in some embodiments, the micro-tip can have a stepped shape, and the tip body 100 can have two or more sections 110, 120 in the length direction of the micro-tip. The length direction of the stepped shaped micro-tip can be a straight line in the same direction from the base 200 to the apex 102. The section 110 that is adjacent to the apex 102 can be a distal section 110. The section 120 that is between the base 200 and the distal section 110 can be a middle section 120. Though the diameter of the micro-tip decreases from the tip body 100 to the apex 102 in general, the diameter ($D_1$) of the middle section 120 can remain constant or not vary greatly to form the stepped shaped micro-tip. The middle section 120 can be a cylinder. The constant diameter ($D_1$) of the middle section 120 can be smaller than the diameter ($D_2$) of the base 200, and be equal to or larger than the diameter of a proximal end 112 of the distal section 110. The proximal end 112 of the distal section 110 is the end closer to the middle section 120. The distal section 110 can have a tapered structure with the diameter gradually decreasing along the axial direction of the micro-tip from the middle section 120 to the apex 102. $D_1$-$D_2$ can be about 5 μm to about 80 μm, in some embodiments, is about 10 μm to about 50 μm, and in an embodiment is about 10 μm. A length of the middle section 120 can be a range from about 10 μm to about 100 μm, and in some embodiments, from about 20 μm to about 40 μm.

Referring to FIG. 4, in an embodiment, the distal section 110 can be a regular cone having a lateral surface with a concavely curved generatrix. The generatrix can be a curve such as a circular, an elliptical, a parabolic, or an exponential curve. The slope of a point on the lateral surface of the distal section 110 increases from the proximal end to the apex 102.

Referring to FIG. 3 and FIG. 5, in an embodiment, the distal section 110 can be a relatively irregular cone having the lateral surface with a converged lateral tip 114 besides the apex 102. The rest of the lateral surface of the distal section 110 except the converged lateral tip 114 and the apex 102 can be relatively smooth. The converged lateral tip 114 on the relatively smooth surface of the distal section 110 can be used as a photon scattering knot in nanoscale to form a nanoscale light field, thereby enhancing the Raman scattering.

The tip body 100 can further have a first transitional section 122 between the base 200 and the middle section 120. The first transitional section 122 can be a tapered structure with a diameter gradually decreasing from $D_2$ to $D_1$. In an embodiment, the first transitional section 122 can be a truncated cone (i.e., a conical frustum) having a lateral surface with a concavely curved generatrix. The generatrix can be a curve such as a circular, an elliptical, a parabolic, or an exponential curve.

The tip body 100 can only have one transitional section (e.g., the first transitional section 122 between the base 200 and the middle section 120) as shown in FIG. 4. In some embodiments, tip body 100 can further comprise a second transitional section between the middle section 120 and the distal section 110. The second transitional section can be a tapered structure with a diameter gradually decreasing from the $D_1$ to the diameter of the proximal end 112 of the distal section 110. In an embodiment, the second transitional section can be a truncated cone (i.e., conical frustum) having a lateral surface with a concavely curved generatrix. The generatrix can be a curve such as a circular, an elliptical, a parabolic, or an exponential curve.

The stepped shape of the micro-tip creates one or more edges on the relatively smooth surface of the micro-tip, which can be used as a photon scattering knot in nanoscale to form a nanoscale light field, thereby enhancing the Raman scattering.

A material of the micro-tip, for first transitional section 122, the middle section 120, the second transitional section, the distal section 110, and/or the apex 102, can be selected from the group consisting of tungsten, silver, gold, and platinum.

Figure 6:
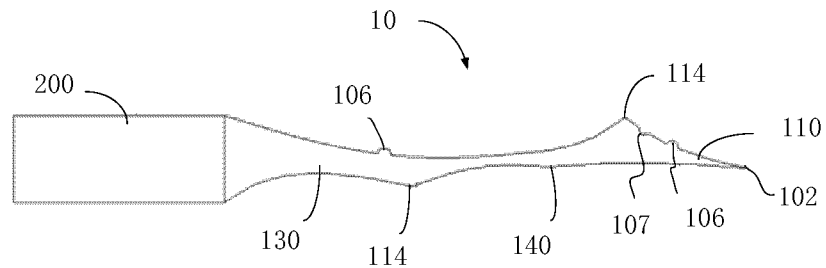
FIG. 6 is a schematic structural view of an embodiment of the scanning probe with the micro-tip having an enhanced scattering surface.
Figure 7:
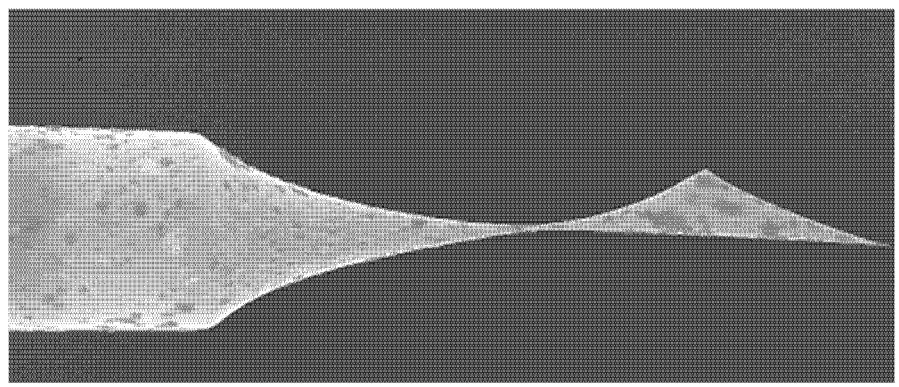
FIG. 7 shows an optical microscope image of an embodiment of the micro-tip having the enhanced scattering surface.
Figure 8:
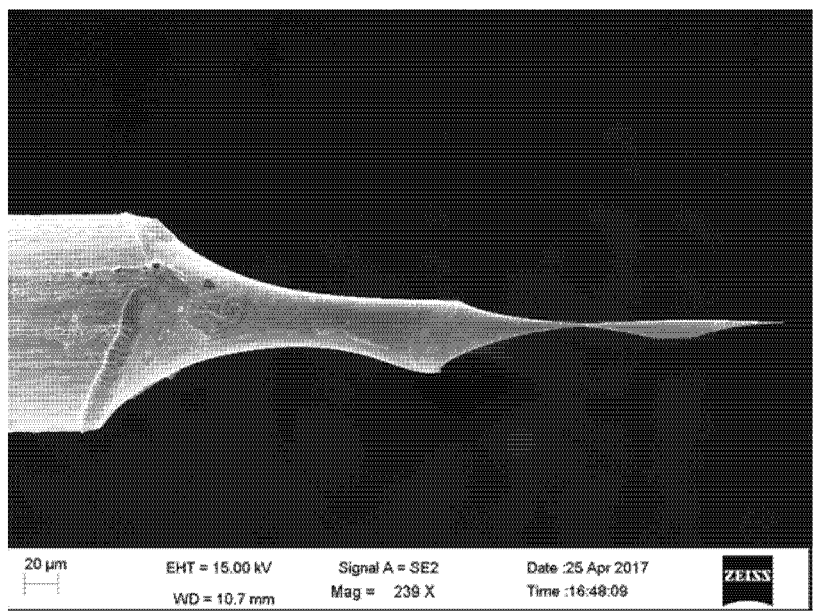
FIG. 8 shows an optical microscope image of another embodiment of the micro-tip having the enhanced scattering surface.

Referring to FIG. 6 to FIG. 8, in some embodiments, the micro-tip has a relatively irregular shape with the diameter decreasing and increasing alternatively in different sections of the micro-tip thereby forming one or more converged lateral tips 114 and/or edges. For example, in the embodiment shown in FIG. 6, the micro-tip comprises two converged lateral tips 114; in the embodiment shown in FIG. 7, the micro-tip comprises one converged lateral tip 114; and in the embodiment shown in FIG. 8, the micro-tip comprises one converged lateral edge and one converged lateral tip 114. The converged lateral tips 114 can divide the micro-tip into one or more diameter-changing sections. Each diameter-changing section has the diameter decreasing and then increasing gradually in the length direction from one end to the opposite end.

Referring to FIG. 6, in an embodiment, the micro-tip can comprise a first diameter-changing section 130, a second diameter-changing section 140, and a distal section 110. Two opposite ends of the second diameter-changing section 140 respectively connect the first diameter-changing section 130 and the distal section 110. The first diameter-changing section 130 is closer to the base 200 than the second diameter-changing section 140. The second diameter-changing section 140 is closer to the distal section 110 than the first diameter-changing section 130.

Referring to FIG. 7 and FIG. 8, the lateral surface of the micro-tip can be relatively smooth, except the converged lateral tip 114, the converged lateral edge, and the apex 102. Referring to FIG. 6, the lateral surface of the micro-tip can further comprise one or more recesses 107 and/or protrusions 106. The converged lateral tip 114, converged lateral edge, recess 107 and/or protrusion 106 on the relatively smooth lateral surface of the micro-tip can be used as a photon scattering knot in nanoscale to form a nanoscale light field, to enhance the Raman scattering. Further, the protrusion 106 on the diameter-changing section can be used as an indicator in a dark-field microscope system to indicate the location of the scanning probe 10.

Figure 9:
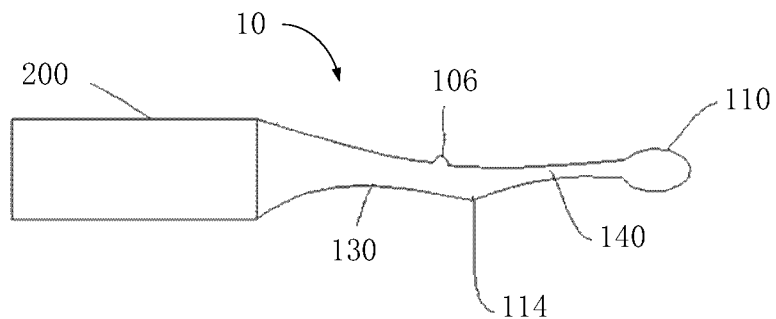
FIG. 9 is a schematic structural view of another embodiment of the scanning probe with the micro-tip having the enhanced scattering surface.

Referring to FIG. 9, the distal section 110 can have a ball shape or an ellipsoid shape in geometry, and the ball shaped or ellipsoid shaped distal section 110 can be used as a photon scattering knot in nanoscale to form a nanoscale light field, to enhance the Raman scattering.

In some embodiments, the micro-tip can have a tapered structure with the diameter gradually decreasing along the axial direction of the micro-tip from the tip body 100 to the apex 102. The axial direction of the micro-tip from the tip body 100 to the apex 102 can be a curved line.

Figure 10:
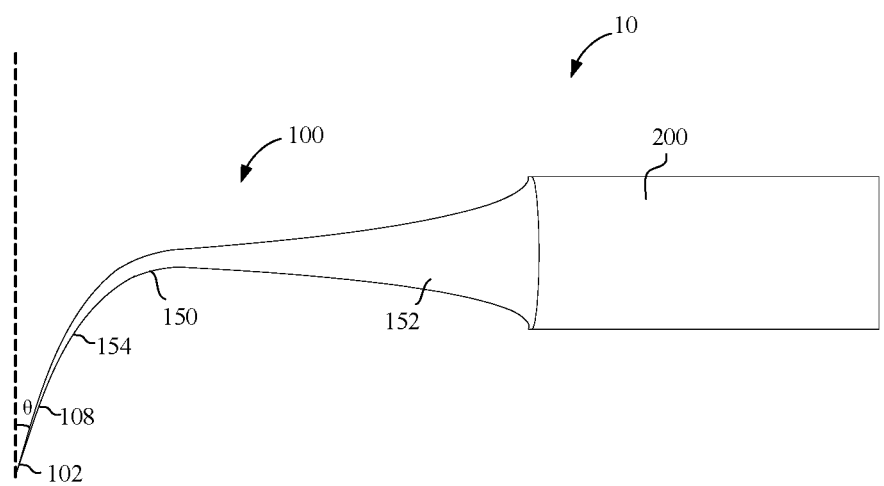
FIG. 10 is a schematic structural view of an embodiment of the scanning probe having a curved micro-tip.
Figure 11:
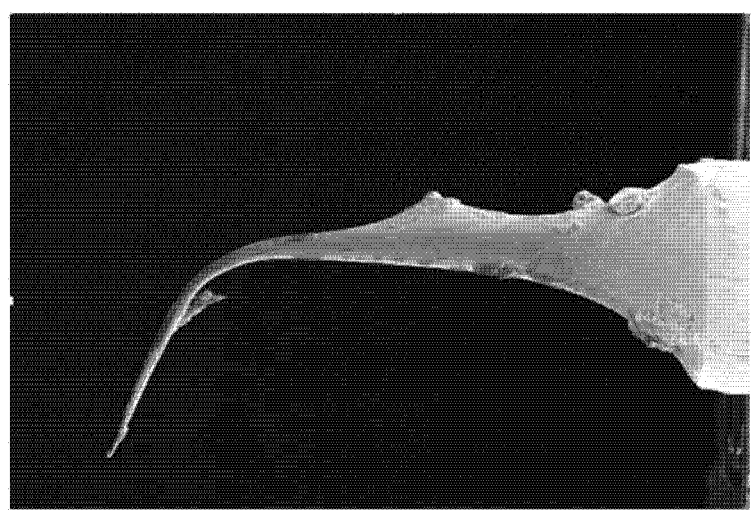
FIG. 11 shows an optical microscope image of an embodiment of the curved micro-tip of the scanning probe.

Referring to FIG. 10 and FIG. 11, in an embodiment, the micro-tip can comprise a curved section 150, a first straight section 152, and a second straight section 154. The curved section 150 is joined between the first straight section 152 and the second straight section 154. The lateral surface smoothly transforming from the first straight section 152 to the second straight section 154 through the curved section 150. The first straight section 152 is closer to the base 200, and the second straight section 154 is closer to the apex 102. The second straight section 154 can be a cone comprising a lateral surface with a concavely curved generatrix 108. The first straight section 152 can be a truncated cone comprising a lateral surface with a concavely curved generatrix 108. The generatrix 108 can be a curve such as a circular, an elliptical, a parabolic, or an exponential curve. The slope of a point on the lateral surface of the first and second straight section 152, 154 of the micro-tip increases from the tip body 100 to the apex 102. When the base 200 is horizontally arranged, an angle θ can be defined between a vertical direction and the axial direction of the second straight section 154. The angle θ can be less than 90 degrees and larger than 0 degree, and in an embodiment, can be about 15 degrees to 60 degrees. In the TERS, the base 200 and the first straight section 152 can be horizontally arranged, and the location of the apex 102 can be calculated through the angle θ and the length of the second straight section 154, thereby precisely locating the apex 102 to the center of the laser beam focus. An angle between an axial direction of the second straight section and an axial direction of the first straight section can be less than 90 degrees and larger than 0 degree, and in an embodiment, can be in a range from about 30 degrees to 75 degrees. The curved section 150 can be used as an indicator to indicate the location of the scanning probe 10, and to calculate the location of the apex 102 of the scanning probe 10.

Referring to FIG. 11, in an embodiment, the lateral surface of the micro-tip can comprise a converged lateral tip located on any, several, or all of the curved section 150, the first straight section 152, and the second straight section 154. In an embodiment, the micro-tip having the curved axial direction can further have a tapered structure, by having the distal section 110, the middle section 120, transitional section 122, the converged lateral edge, the converged lateral tip 114, the recess 107, the protrusion 106 of any of the above-described embodiments, or a combination thereof.

Figure 12:
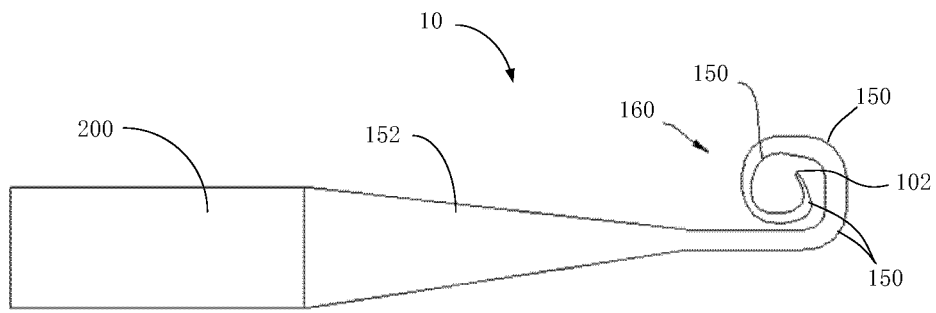
FIG. 12 is a schematic structural view of another embodiment of the scanning probe having the curved micro-tip.

Referring to FIG. 12 and FIG. 13, in an embodiment, the micro-tip can comprise a plurality of curved sections 150 and a plurality of straight sections 152, alternatively joined to one another. One curved section 150 is joined between two straight sections 152. The plurality of curved sections 150 and the plurality of straight sections 152 cooperatively form a conic spiral structure 160, which is a tree-dimensional spiral, at the distal end of the micro-tip. The apex 102 of the micro-tip can be located at the center of the conic spiral structure 160. A length of the micro-tip in the conic spiral structure 160 can be in a range from about 200 μm to about 400 μm. A pitch of the conic spiral structure 160 can gradually decrease from the periphery to the center.

In some embodiments, the micro-tip can comprise a hook structure at the distal end of the micro-tip. Referring to FIG. 14, in an embodiment, the micro-tip can comprise a first straight section 152, a second straight section 154 and a curved section 150 joined between the first straight section 152 and the second straight section 154 to cooperatively form the hook structure 162. An angle between the length direction of the first straight section 152 and the second straight section 154 can be about 90 degrees. The first straight section 152 comprises a recess 107. The curved section 150 comprises a protrusion 106. The protrusion 106 can be used as an indicator in a dark-field microscope system to indicate the location of the scanning probe 10.

Figure 15:
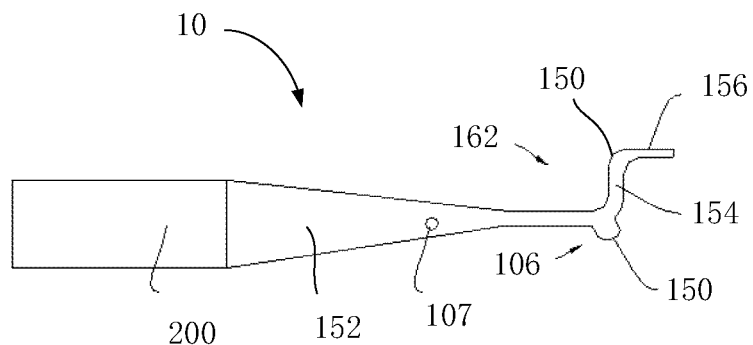
FIG. 15 is a schematic structural view of yet another embodiment of the scanning probe having the curved micro-tip.

Referring to FIG. 15, in another embodiment, the micro-tip can comprise a first straight section 152, a second straight section 154, a third straight section 156, and two curved section 150 respectively joined between the first straight section 152 and the second straight section 154, and between the second straight section 154 and the third straight section 156, to cooperatively form the hook structure 162. An angle between the length direction of the first straight section 152 and the second straight section 154 can be about 90 degrees. An angle between the length direction of the second straight section 154 and the third straight section 156 can be about 90 degrees. An extending direction of the third straight section 156 is away from the base 200. The first straight section 152 comprises a recess 107. One of the two curved sections 150 comprises a protrusion 106. The protrusion 106 can be used as an indicator in a dark-field microscope system to indicate the location of the scanning probe 10.

Figure 16:
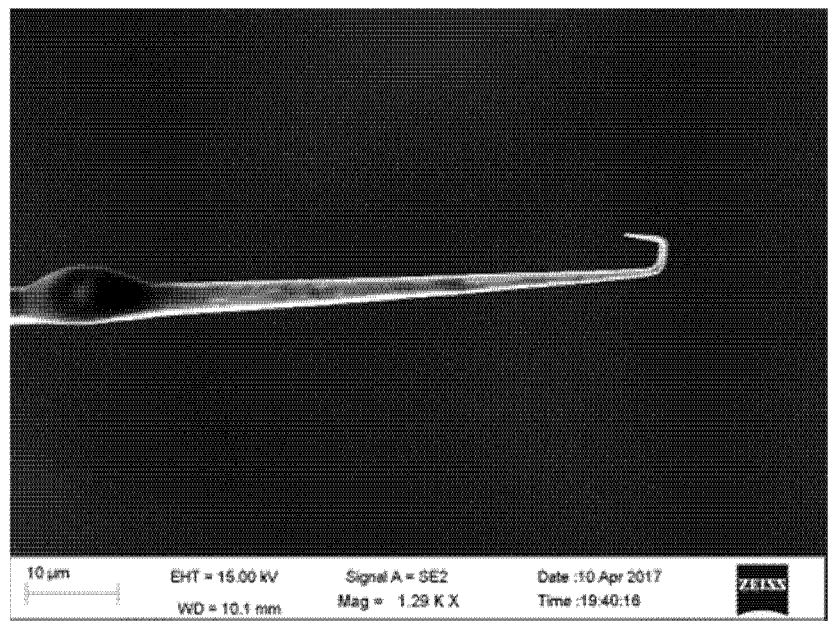
FIG. 16 shows an optical microscope image of yet another embodiment of the curved micro-tip of the scanning probe.

Referring to FIG. 16, in yet another embodiment, the micro-tip can comprise a shape similar to the embodiment of the micro-tip in FIG. 15 except that the third straight section 156 extends toward the base 200.

Figure 17:
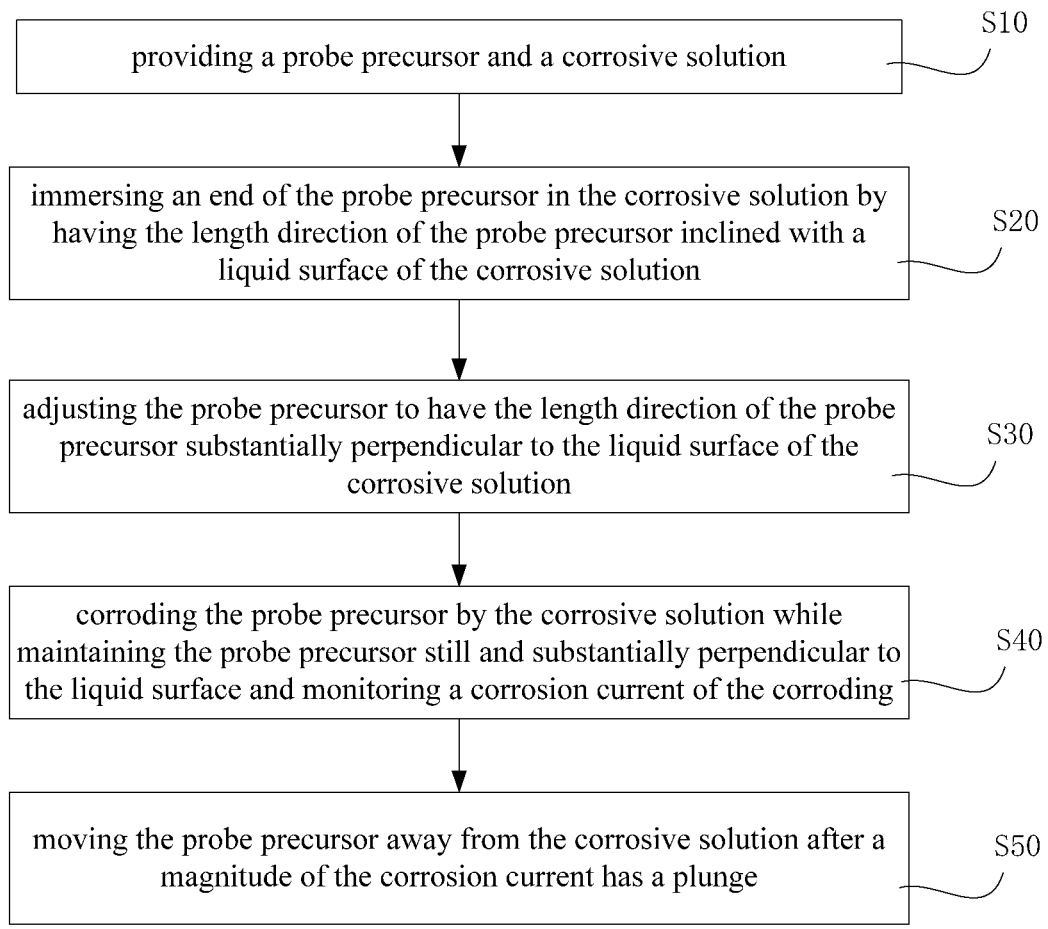
FIG. 17 is a flow chart of one embodiment of a method for manufacturing the scanning probe.
Figure 18:
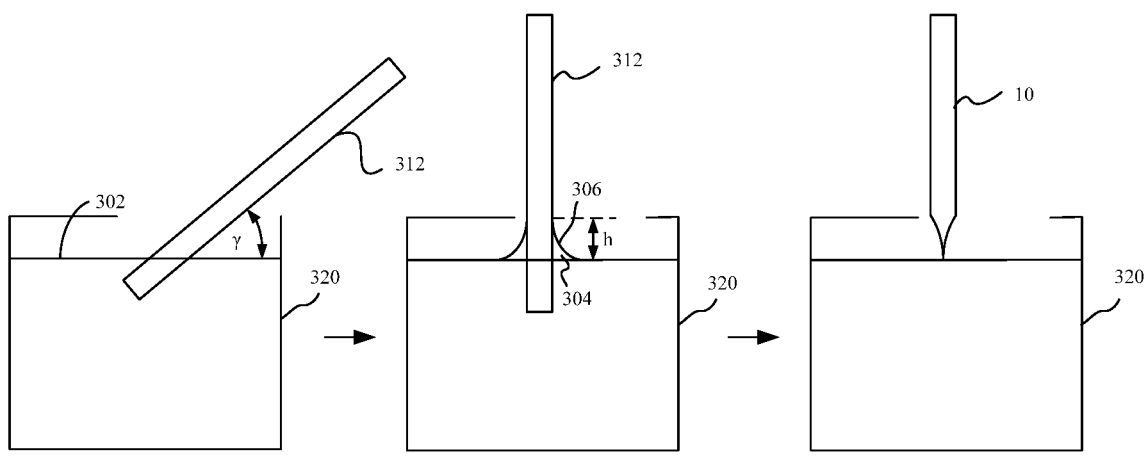
FIG. 18 is a schematic structural view of one embodiment of a method for manufacturing the scanning probe.

Referring to FIG. 17 and FIG. 18, an embodiment of a method for manufacturing a scanning probe 10, the method comprises:

S10, providing a probe precursor 312 and a corrosive solution, the probe precursor 312 having a length direction, the corrosive solution is capable of corroding the probe precursor 312;

S20, immersing an end of the probe precursor 312 in the corrosive solution by having the length direction of the probe precursor 312 inclined with a liquid surface 302 of the corrosive solution;

S30, adjusting the probe precursor 312 to have the length direction of the probe precursor 312 substantially perpendicular to the liquid surface 302 of the corrosive solution;

S40, corroding the probe precursor 312 by the corrosive solution while maintaining the probe precursor 312 still and substantially perpendicular to the liquid surface 302 and monitoring a corrosion current of the corroding; and S50, moving the probe precursor 312 away from the corrosive solution after a magnitude of the corrosion current has a plunge;

wherein S20 to S50 are proceed in a condition-stable environment.

The probe precursor 312 of the scanning probe 10 can have a rod shape or a bar shape with a straight shape. A diameter or a cross-sectional size of the probe precursor 312 can be in a range from about 200 micrometers (μm) to about 1000 μm. A length of the probe precursor 312 can be larger than 500 μm. In an embodiment, the length of the probe precursor 312 can be in a range from about 0.1 mm to 1 cm. The probe precursor 312 and the base 200 of the scanning probe 10 can have the same diameter or the cross-sectional size because the section of the probe precursor 312 that is not corroded by the corrosive solution is to be the base 200 of the scanning probe 10. The material of the probe precursor 312 can be electrochemically corroded by the corrosive solution, and the corrosion current can be monitored between the probe precursor 312 and another electrode in the corrosive solution. In some embodiments, the material of the probe precursor 312 can be gold, silver, platinum, tungsten, or optical fiber. In an embodiment, the probe precursor 312 can have a fresh cutting end to remove a passivating film formed on the surface of the metal material.

The corrosive solution can include a corroding agent dissolved in a solvent. The corroding agent can be selected from the group consisting of hydrochloric acid, nitric acid, dilute sulfuric acid, sodium hydroxide, potassium hydroxide (NaOH), sodium hydrogen carbonate ($NaHCO_3$), potassium hydrogen carbonate, and combinations thereof. The corroding agent can be saturated in the corrosive solution to achieve a rapid corroding speed. In some embodiments, a concentration of the corroding agent in the corrosive solution can be in a range from about 0.1 mol/L to about 2 mol/L. In an embodiment, the corroding agent is NaOH, a concentration of NaOH is about 1.5 mol/L, and the material of the probe precursor 312 is tungsten.

In an embodiment, the corrosive solution can further include a buffering agent to regulate a corroding speed. The buffering agent can be selected from the group consisting of magnesium sulfate, copper sulfate, sodium chloride (NaCl), copper chloride, and combinations thereof. In an embodiment, the corroding agent is NaOH and the buffering agent is $NaHCO_3$. In another embodiment, the corroding agent is $NaHCO_3$ and the buffering agent is NaCl.

The surface of the probe precursor 312 is wettable to the corrosive solution.

The condition-stable environment can be an environment having a constant temperature and a constant humidity. The constant temperature can be 20° C.±0.5° C. The constant humidity can be a relative humidity which is greater than 70%. The condition-stable environment can be substantially closed to avoid an airflow disturbance. In an embodiment, the corrosive solution can be contained in a substantially closed container 320 with only an opening having a size that is suitable for the probe precursor 312 being adjusted therethrough.

In S20, the end of the probe precursor 312 can be obliquely inserted into the liquid surface 302 of the corrosive solution to avoid bringing gas into the corrosive solution with the insertion of the probe precursor 312. The gas bubbles, even in micro-size, attached on the probe precursor 312 will cause a non-uniform corroding of the surface of the probe precursor 312 to increase a roughness of the formed micro-tip of the scanning probe 10. In an embodiment, an angle γ between the length direction of the probe precursor 312 and the liquid surface 302 of the corrosive solution can be substantially equal to a contact angle between the probe precursor 312 and the corrosive solution. In some embodiments, the angle γ can be in a range from about 20 degrees to about 70 degrees, and in an embodiment, can be about 30 degrees.

In S30, after the end of the probe precursor 312 is immersed in the corrosive solution, the direction of the probe precursor 312 is adjusted to substantially vertical and thereby being perpendicular to the liquid surface 302 of the corrosive solution. The substantially vertical and perpendicular means that a deviation angle is less than 1 degree, and in an embodiment less than 0.1 degrees. While adjusting the direction of the probe precursor 312, the end of the probe precursor 312 is always kept in the corrosive solution without being completely pulled out from the corrosive solution. The probe precursor 312 is not completely immersed in the corrosive solution but intersected with the liquid surface 302 of the corrosive solution. The immersed portion is from the end of the probe precursor 312 to the liquid surface 302 of the corrosive solution. The longer the immersed portion of the probe precursor 312, the more the corrosive solution is needed to react with the immersed portion, and the greater the affect to a chemical equilibrium of the corroding in a limited amount of corrosive solution. In an embodiment, a length of the portion that is immersed in the corrosive solution of the probe precursor 312 can be less than 100 micrometers (μm). If the probe precursor 312 is inserted too much in the corrosive solution in S20, the adjusting in S30 can also include adjusting the immersed length of the probe precursor 312 by pulling the probe precursor 312 vertically from the corrosive solution to a desired height. For example, an initial immersed portion is about 500 μm and the probe precursor 312 is pulled until 100 μm of the probe precursor 312 is left in the corrosive solution.

Referring to FIG. 18, due to a surface tension of the corrosive solution, the liquid surface 302 is raised up around the probe precursor 312 and forms a liquid cone 304 under the action of gravity. The higher the less of the corrosive solution around the probe precursor 312. The liquid cone 304 can have a concavely curved generatrix 306. The height h of the liquid cone 304 and the shape of the concavely curved generatrix 306 are related to the surface tension of the corrosive solution and the contact angle between the probe precursor 312 and the corrosive solution. The surface tension and the contact angle vary with the components and concentrations of the components of the corrosive solution and the material of the probe precursor 312. Therefore, the shape of the liquid cone 304 can be adjusted by adjusting the corrosive solution and the probe precursor 312. In some embodiments, the height h of the liquid cone 304 can be in a range from about 10 µm to about 300 µm. As the liquid cone 304 formed by the corrosive solution will react with the probe precursor 312 to form the micro-tip, the shape of the micro-tip can be decided by the shape of the liquid cone 304 and the section of the micro-tip comprising the lateral surface with the concavely curved generatrix 108 can be formed. By adjusting the height h of the liquid cone 304, the length of the micro-tip of the scanning probe 10 can be achieved. By adjusting the shape of the liquid cone 304, the desired shape of the concavely curved generatrix 108 can be achieved.

Figure 19:
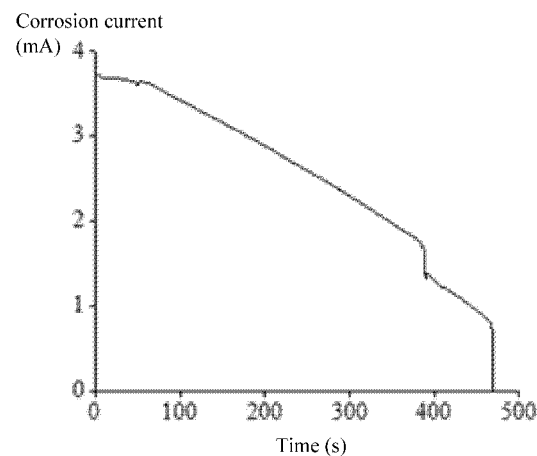
FIG. 19 is a graph showing a corrosion current-time curve obtained in manufacturing of an embodiment of the scanning probe.

In S40, the section of the probe precursor 312 under the liquid surface 302 and surrounded by the liquid cone 304 reacts with the corrosive solution. The section of the probe precursor 312 under the liquid surface 302 is completely removed or broken up from the section of the probe precursor 312 above the liquid surface 302 by the corroding reaction. As the amount of the corrosive solution of the liquid cone 304 is small, the section of the probe precursor 312 surrounded by the liquid cone 304 is partially removed to form the micro-tip of the scanning probe 10. The corrosion current can be real-time monitored during the corroding of the probe precursor 312 to decide the corroding stage. In an embodiment, an opposite electrode can be inserted into the same corrosive solution, and a current monitor such as an ammeter can be connected between the probe precursor 312 and the opposite electrode to real-time monitor the corrosion current. During the corroding reaction, the corrosion current decreases smoothly with time as the cross-sectional size of the probe precursor 312 decreases. After a period of time, a plunge of the corrosion current can be observed indicating the corrosion current dropped greatly and suddenly. The plunge of the corrosion current corresponds to the break-up between the above section and the lower section of the probe precursor 312 at the liquid cone 304. After the plunge, the corrosion current may still be detectable as a residual amount of corrosion current still exists between the formed micro-tip and the liquid surface 302. Referring to FIG. 19, in an embodiment, the plunge of the corrosion current occurs at about 400 seconds of the corroding.

In S50, after the plunge occurred, the probe precursor 312 can be moved away from the corrosive solution vertically or obliquely. The angle γ between the length direction of the probe precursor 312 and the liquid surface 302 of the corrosive solution during the moving away of the probe precursor 312 can be substantially equal to a contact angle between the probe precursor 312 and the corrosive solution. In some embodiments, the angle γ can be in a range from about 20 degrees to about 70 degrees, and in an embodiment, can be about 30 degrees.

The residue corrosive solution on the formed micro-tip can be rinsed away in a step S60 by a solvent such as deionized water or an organic solvent such as isopropanol. At this stage, a straight scanning probe 10 such as the embodiment shown in FIG. 1 and FIG. 2 can be obtained. The corroding can be conveniently controlled by monitoring the corrosion current and applying the plunge as a threshold of the corroding.

In an embodiment, the method for manufacturing the scanning probe 10 can further comprises:

S610, rinsing the micro-tip with a buffer solution for several times; and

S620, rinsing the micro-tip, which has been rinsed by the buffer solution, with isopropanol for several times.

The buffer solution can include the buffer agent, which can be a combination of $NaHCO_3$ and NaCl in one embodiment, or a saturated $NaHCO_3$ solution in another embodiment. In an embodiment, the probe precursor is obliquely moved away from the corrosive solution, rinsed with $NaHCO_3$/NaCl twice, and then rinsed with isopropanol twice to terminate the corroding reaction in a short time.

The method can further include steps S32 to S34 between the step S30 and the step S40 to form the stepped shaped micro-tip in the embodiments such as shown in FIG. 3 to FIG. 5:

S32, corroding the probe precursor 312 by the corrosive solution in a period of time while maintaining the probe precursor 312 still and substantially perpendicular to the liquid surface 302; and S34, moving a first section of the probe precursor 312 out from the corrosive solution.

Steps S32 and S34 are proceeded before the magnitude of the corrosion current has the plunge. During the steps S32 and S34, the end of the probe precursor 312 is always kept in the corrosive solution without being completely pulled out from the corrosive solution. The first section of the probe precursor 312 can be pulled out from the corrosive solution in S34 to form the middle section 120 of the stepped shaped micro-tip.

In step S32, the first section of the probe precursor 312 is located below the liquid surface 302 so corroded by the corrosive solution for the period of time in step S32. The diameter of the first section decreases uniformly under the liquid surface 302 due to the corroding. In some embodiments, the period of time in S32 can be in a range from about 5 seconds to about 60 seconds, a length of the first section can be in a range from about 20 µm to about 40 µm. In some further embodiments, the period of time in S32 can be in a range from about 30 seconds to about 60 seconds. By adjusting the period of time, a difference between the constant diameter ($D_1$) of the middle section 120 and the diameter ($D_2$) of the base 200 can be adjusted. In an embodiment, $D_1$-$D_2$ is about 10 µm. A liquid cone 304 can be formed above the liquid surface 302 around a second section of the probe precursor 312. Accordingly, the second section of the probe precursor 312 above the liquid surface 302 can be synchronously corroded by the liquid cone 304 to form a tapered structure with a diameter gradually decreasing from the original diameter of the probe precursor 312 to the diameter of the first section. The first section of the probe precursor 312 forms the middle section 120 of the scanning probe 10, and the second section of the probe precursor 312 forms the first transitional section 122 of the scanning probe 10.

In step S34, the moving can be in a direction that is substantially vertical and perpendicular to the liquid surface 302 of the corrosive solution.

Steps S32 and S34 can be repeated one or several times to form a plurality of steps in the length direction of the probe precursor 312 as long as the previously immersed portion of the probe precursor 312 is long enough.

After the step S34, the distal end of the probe precursor 312 is still immersed in the corrosive solution so the steps S30 and S40 can then be proceeded.

The method for manufacturing the scanning probe 10 can further include steps S70 after the step S50 to further varies the shape of the micro-tip by further corroding:

S70, corroding the probe precursor 312 by additional corrosive solution after the probe precursor 312 is moved away from the corrosive solution.

The additional corrosive solution can be applied to the probe precursor 312 by different methods. An amount of the additional corrosive solution can be in a range from about 2 μL to about 3 μL. In an embodiment, the step S70 includes obliquely aligning the probe precursor 312 and dropping one or several drops of the additional corrosive solution on the formed micro-tip. The drops of the additional corrosive solution can be generated by using a pipette. In another embodiment, the step S70 includes obliquely aligning the probe precursor 312 and corroding the probe precursor 312 by the residue corrosive solution on the micro-tip without the rinsing step after the step S50. Under the action of the gravity, the additional corrosive solution can be flowed on the surface of the micro-tip to form irregular shape such as in the embodiments shown in FIGS. 6 to 8. During the corroding, the probe precursor 312 can be simultaneously rotated to change the direction thereby aggregating the additional corrosive solution on a local area of the micro-tip to form the irregular shape.

The step S70 can further include irradiating the additional corrosive solution on the micro-tip with a laser beam to heat the additional corrosive solution thereby promoting the corroding. A power of the laser beam can be in a range from about 3 Watts (W) to about 5 W. A wavelength of the laser beam can be about 1550 nm. The laser beam can be focused on the additional corrosive solution or the micro-tip in a dark-field microscope system. As the amount of the additional corrosive solution can be very small, the corroding reaction can be spontaneous terminated in about 3 seconds to 5 seconds.

The method for manufacturing the scanning probe 10 can further include steps S80 after the step S50 to further varies the shape of the micro-tip by laser beam irradiation:

S80, obliquely or horizontally aligning the probe precursor 312, and irradiating the micro-tip with a laser beam thereby curving the micro-tip after the probe precursor 312 is moved away from the corrosive solution.

The curving of the micro-tip forms the curved section 150 of the scanning probe 10 in the embodiments such as shown in FIG. 10 to FIG. 16. The laser beam can be irradiated on the micro-tip before or after the micro-tip is rinsed. The irradiating in step S80 can last for about 10 seconds to about 60 seconds. The laser beam can be focused on a local area of the micro-tip thereby heating the local area in a dark-field microscope system. The irradiated local area can be at a middle portion of the micro-tip. In some embodiments, the irradiated local area can be about 2 μm to about 500 μm away from the apex 102. In an embodiment, the local area can be previously corroded by the drops of the additional corrosive solution in the step S70 thereby is narrowed and easy to be curved under an action of the gravity.

The obliquely or horizontally aligned micro-tip can be curved under the action of the gravity from the irradiated local area. A curving angle, such as the angle θ in FIG. 10, of the micro-tip can be decided by the irradiating time. The forming of the curving angle can be real-time observed in the in a dark-field microscope system. The irradiating can be terminated once the desired curving angle of the micro-tip is achieved. The curved scanning probe 10 can be obtained after the irradiated area of the micro-tip is cooled to room temperature.

In some embodiments such as in FIG. 12 to FIG. 15, several local areas on the micro-tip can be irradiated one by one by the laser beam to form a plurality of curved sections 150 along the length direction of the micro-tip. The laser beam irradiation can occur with the rotating and/or adjusting the aligning direction of the micro-tip. The step S80 can further include irradiating a plurality of local areas one by one by the laser beam, and changing the aligning direction of the probe precursor 312 between two adjacent irradiating to form the plurality of curved sections 150 curving toward different directions under the action of the gravity.

Figure 20:
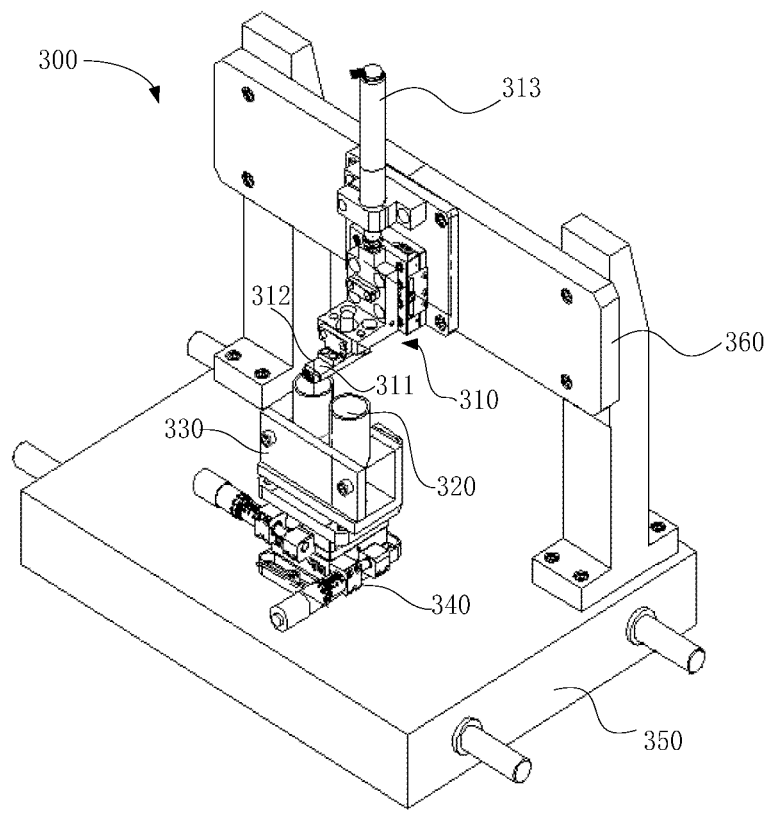
FIG. 20 is a schematic structural view of an embodiment of an apparatus for manufacturing the scanning probe.

Referring to FIG. 20, an embodiment of a scanning probe manufacturing apparatus 300 for manufacturing the scanning probe 10 is provided. The apparatus 300 can include a driving device 310 and a reacting container 320.

The driving device 310 can include a fastener 311 configured to fasten the probe precursor 312. In an embodiment, the fastener 311 is a clamp. The reacting container 320 contains the corrosive solution. The driving device 310 is configured to move the probe precursor 312 in the reacting container 320 through the fastener 311. More specifically, the driving device 310 can drive the fastener 311 to move and/or rotate thereby moving and/or changing direction of the probe precursor 312 clamped by the fastener 311 in three dimensional space.

In an embodiment, the driving device 310 includes a stepper motor 313 and a piezoelectric ceramics 314 connected with the stepper motor 313 to cooperatively worked as a driving unit to drive the fastener 311. In an embodiment, the driving device 310 can further include a first controller to control the stepper motor 313 and a second controller to control the piezoelectric ceramics 314. The first controller is electrically connected with the stepper motor 313. The second controller is electrically connected with the piezoelectric ceramics 314.

Figure 21:
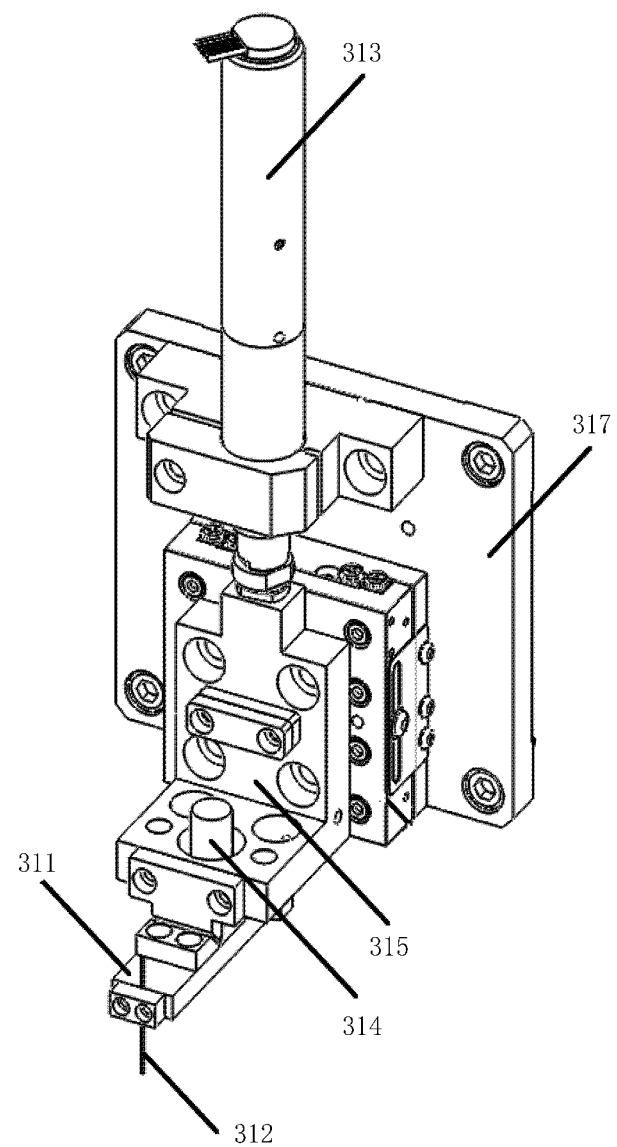
FIG. 21 is a schematic structural view of an embodiment of a driving device of the apparatus.

Referring to FIG. 21, in an embodiment, the driving device 310 can further include a moving member 315 and a substrate 317. The moving member 315 is movable to the substrate 317. The fastener 311 and/or the piezoelectric ceramics 314 can be fixed to the moving member 315 thereby moving with the moving member 315. The rotator of the stepper motor 313 is connected with the moving member 315, thereby driving the moving member 315 to horizontally move and/or a vertically move the fastener 311 and/or the piezoelectric ceramics 314. The stator of the stepper motor 313 is fixed to the substrate 317. In an embodiment, the substrate 317 is vertically arranged, and the moving member 315 can be vertically moved on the substrate 317.

The stepper motor 313 is an open loop control element that converts the electrical pulse signal into an angular displacement or a linear displacement. In response to a pulse signal, the stepper motor 313 is driven to rotate by a fixed angle in a set direction. The rotation of the stepper motor 313 is performed step by step at the fixed angle, and the angular displacement can be controlled by controlling the number of pulses to achieve accurate positioning. The stepper motor 313 can control the speed and acceleration of the motor rotation by controlling the pulse frequency, thereby achieving a speed regulation. The stepper motor 313 can control the probe precursor 312 to move in the corrosive solution at a relatively large scale.

The piezoelectric ceramics 314 has an inverse piezoelectric effect, and will have a slight deformation under the action of an electric field. The piezoelectric ceramics 314 can be used as a micro-displacement actuator to achieve a precisely controlled slight displacement by using the inverse piezoelectric effect. Precise control.

The piezoelectric ceramics 314 controls the upward or downward displacement of the probe precursor 312 in the corrosive solution by the second controller 392, which can accurately control a few nanometers. The liquid surface 302 of the corrosive solution is not disturbed during the movement, so that the corroding of the probe precursor 312 during the movement in the corrosive solution is relatively stable.

By combining the piezoelectric ceramics 314 with the stepper motor 313, the fastener 311 can be synchronously driven such that the probe precursor 312 moves vertically in the corrosive solution without disturbing the chemical reaction. Thus, the surface topography and size, which are formed by the corroding, of the scanning probe 10 will not be damaged by the movement.

In an embodiment, the scanning probe manufacturing apparatus 300 further includes a table 350, a fixing frame 360, and a displacement mobile station 340. The table 350 is configured to place and support the driving device 310 and the reacting container 320. The fixing frame 360 is disposed on the table 350. A height of the fixing frame 360 is higher than the reacting container 320 for fixedly supporting the driving device 310. The displacement mobile station 340 is disposed on the table 350 for adjusting the position of the reacting container 320.

The displacement mobile station 340 can be a three-dimensional displacement station to adjust the position of the reacting container 320 in three directions.

Figure 22:
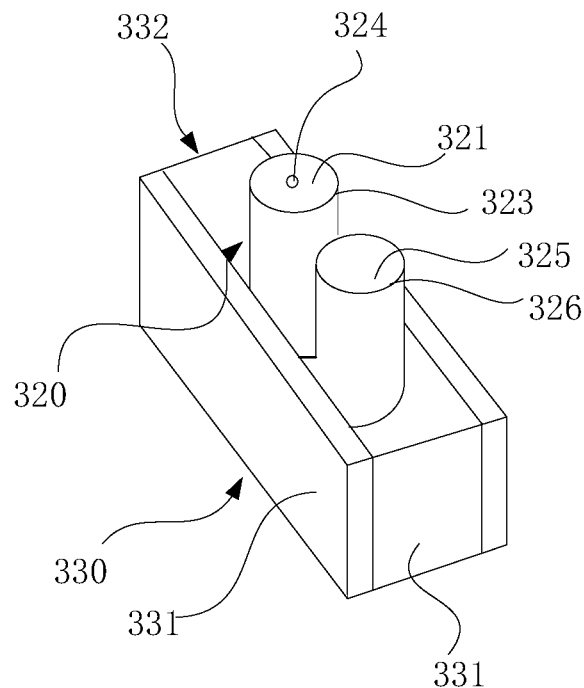
FIG. 22 is a schematic structural view of an embodiment of a reacting device of the apparatus.

Referring to FIG. 22, in an embodiment, the scanning probe manufacturing apparatus 300 further includes a reactor holding tank 330. The reactor holding tank 330 is disposed on the displacement mobile station 340, and the tank wall 331 of the reactor holding tank 330 surrounds the reacting container 320 to form a reactor accommodating space 332 for accommodating the reacting container 320. The reactor holding tank 330 disposed on the displacement mobile station 340 is configured to adjust the reacting container 320.

Figure 23:
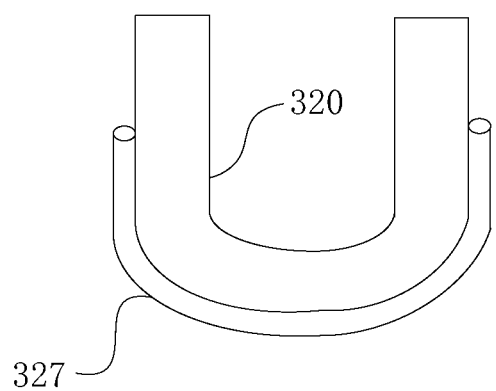
FIG. 23 is a schematic structural view of an embodiment of a reacting device of the apparatus, having a cooling system attached to a container of the reacting device.

Referring to FIG. 23, in an embodiment, the reacting container 320 is a U-shaped reactor having an inner diameter of about 1 cm and an outer diameter of about 2.4 cm. The U-shaped reactor has two openings at two opposite ends. The reacting container 320 can be made of quartz material. In an embodiment, the scanning probe manufacturing apparatus 300 further includes a first sealing plate 321 and a second sealing plate 325. The first sealing plate 321 is fixedly coupled to the first opening 323 of the reacting container 320. A small hole 324 is defined on the first sealing plate 321 for allowing the probe precursor 312 to enter and exit the reacting container 320. The second sealing plate 325 is fixedly coupled to the second opening 326 of the reacting container 320 for sealing the second opening 326 of the reaction container 320. The probe precursor 312 can be inserted into the corrosive solution through the small hole 324. The first sealing plate 321 and the second sealing plate 325 can form a relatively closed environment in the reacting container 320. Thereby, the probe precursor 312 can be electrochemically corroded in the relatively closed environment to avoid environmental disturbance. In an embodiment, the scanning probe manufacturing apparatus 300 further includes a circulating cooling device 327. The circulating cooling device 327 can be disposed around the ourter wall of the reacting container 320 to provide a constant temperature within the reacting container 320. Specifically, the circulating cooling device 327 can be a pipeline surrounding the outer wall of the reacting container 320. A continuously circulating anhydrous ethanol can be placed in and passed through the pipeline. The reacting container 320 can be rapidly cooled by the circulating of the anhydrous ethanol such that the temperature within the reacting container 320 can be kept constant.

In an embodiment, the scanning probe manufacturing apparatus 300 further includes a dryer, a temperature and humidity monitoring module, and a temperature and humidity controller. A desiccant can be placed in the dryer, and the dryer can be placed in the reactor holding tank 330, so that the humidity in the reactor holding tank 330 can be controlled, thereby control the internal humidity of the reacting container 320. The temperature and humidity monitoring module is configured to monitor the temperature and humidity in the reactor holding tank 330 to ensure a constant temperature and humidity in the environment when preparing the scanning probe 10.

Figure 24:
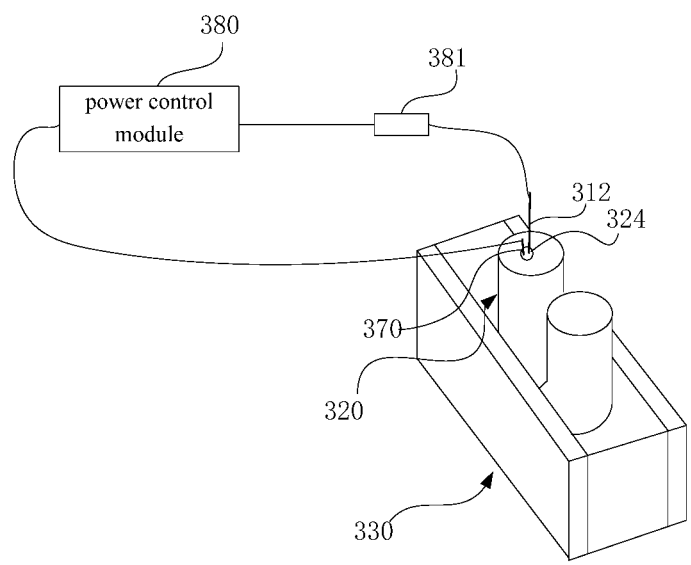
FIG. 24 is a schematic structural view of an embodiment of an electrical connection in the apparatus.

Referring to FIG. 24, in an embodiment, the scanning probe manufacturing apparatus 300 further includes an electrode 370 and a power control module 380. The electrode 370 is disposed in the corrosive solution of the reacting container 320. One end of the power control module 380 is electrically connected to the electrode 370, and the other end of the power control module 380 is electrically connected to the probe precursor 312 for detecting the corrosion current passing through the probe precursor 312 and controlling the driving device 310 of the scanning probe manufacturing apparatus 300 in response to the corrosion current. The power control module 380 can be a proportional-integral-derivative (PID) controller or a field-programmable gate array (FPGA). The electrode 370 can be disposed in the corrosive solution of the reacting container 320 through the small hole 324. The power control module 380 can be electrically connected to the electrode 370 at one end and electrically connected to the probe precursor 312 at the other end, and can detect the current of the probe precursor 312 during the electrochemical reaction.

In an embodiment, the scanning probe manufacturing apparatus 300 further includes a sampling resistor 381. One end of the sampling resistor 381 can be electrically connected to the probe precursor 312, and the other end of the sampling resistor 381 can be electrically connected to the power control module 380 for detecting current passing through the probe precursor 312. The sampling resistor 381 can be connected in series with the power control module 380 in the circuit. The change of the corrosive current of the probe precursor 312 during the electrochemical reaction can be obtained by detecting the current passing through the sampling resistor 381.

When the current of the probe precursor 312 has a sudden change such as a plunge during the electrochemical reaction, the power supply to the driving device 310 is turned off by a feedback program in the power control module 380. At this time, the probe precursor 312 which has been etched can be removed from the liquid surface 302 of the corrosive solution by the piezoelectric ceramics 314, and can be pulled away from the first opening 323 of the reacting container 320 by about 2 cm, rinsed with water for several times to obtain the scanning probe 10. In an embodiment, the scanning probe manufacturing apparatus 300 can also include a dark field optical microscope system, a laser, and a micropipetting injector.

Figure 25:
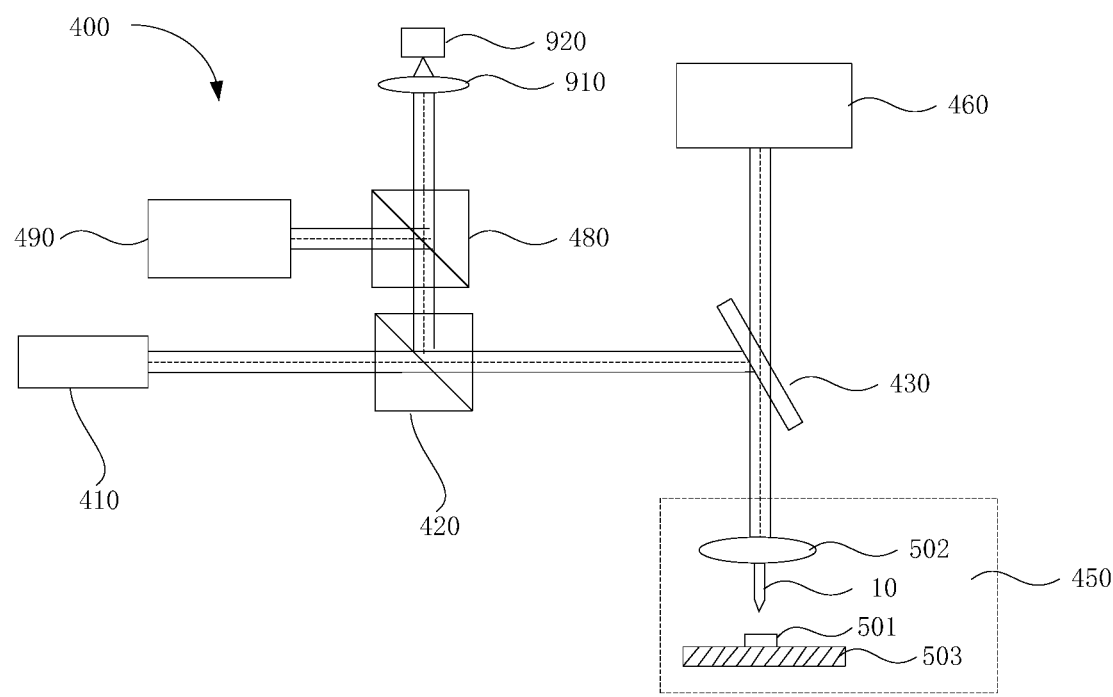
FIG. 25 is a block diagram of an embodiment of a tip-enhanced Raman spectroscope system.

Referring to FIG. 25, the present disclosure also provides a tip-enhanced Raman spectroscope system 400, which can be a micro-area confocal Raman spectroscope system, including a laser emitting unit 410, a first prism 420, a first dichroic beam splitter 430, a laser excitation unit 450, a first Raman spectrometer 460, a second prism 480, and a confocal detecting unit 490. The laser emitting unit 410 is configured to emit laser beam. The laser excitation unit 450 includes a sample stage 503 and a scanning probe 10. The sample stage 503 is configured to have the sample 501 disposed thereon such that the incident laser beam is transmitted to the sample 501 to excite scattered lights, including both Raman scattered light and Rayleigh scattered light, from the surface of the sample 501. The micro-tip of the scanning probe 10 is positioned at the focus center of the laser beam, and an electromagnetic field at the apex 102 of the scanning probe 10 is confined and enhanced thereby enhancing the Raman scattering signal from the sample 501 in the vicinity of the apex 102. The scattered lights can pass through the same optical path of the incident laser beam. The first dichroic beam splitter 430 is disposed on both the optical path of the incident laser beam and the optical path of the scattered lights. The first dichroic beam splitter 430 is configured to reflect the incident laser beam to the sample 501 and split the Raman scattered light from the Rayleigh scattered light in the scattered lights. The first Raman spectrometer 460 is disposed on the optical path of the Raman scattered light split by the first dichroic beam splitter 430 to obtain a Raman spectrum of the sample 501. The first prism 420 is disposed on the optical path of the Rayleigh scattered light split by the first dichroic beam splitter 430, and reflects the Rayleigh scattered light to the second prism 480. The Rayleigh scattered light is further split by the second prism 480 into two Rayleigh scattered light beams. The confocal detecting unit 490 is disposed on the optical path of one of the two Rayleigh scattered light beams to obtain a high resolution image of the sample 501.

The laser emitting unit 410 emits the laser beam that enters an optical fiber through a coupler, and is split into two incident laser beams by the first prism 420. The first prism 420 can be disposed on the optical path of the laser beam emitted by the laser emitting unit 410 to split the incident laser beam into a first incident laser beam and a second incident laser beam. The first dichroic beam splitter 430 is disposed on the optical path of the first incident laser beam. The first incident laser beam is reflected to the sample 501 by the first dichroic beam splitter 430.

Figure 26:
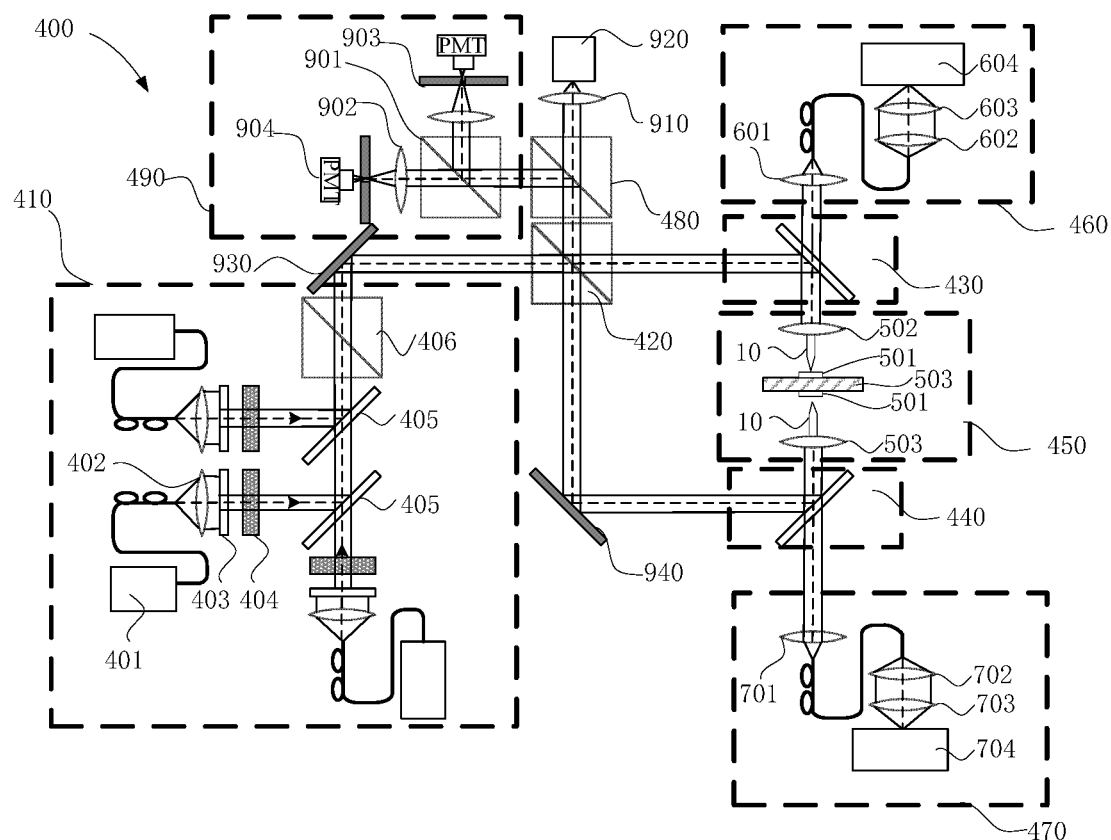
FIG. 26 is a block diagram of another embodiment of a tip-enhanced Raman spectroscope system.

Referring to FIG. 26, in an embodiment, the tip-enhanced Raman spectroscope system 400 further includes a second dichroic beam splitter 440 and a second Raman spectrometer 470. The second dichroic beam splitter 440 is disposed on the optical path of second incident laser beam after the first prism 420. The sample 501 is disposed between the first incident laser beam and the second incident laser beam. That is, both of the first incident laser beam and the second incident laser beam can be focused on the sample. The laser excitation unit 450 can include two scanning probes 10. The micro-tips of the two scanning probes 10 are respectively positioned at the two focus centers of the first incident laser beam and the second incident laser beam to enhance the scattered lights of the sample 501. The sample stage 503 can be transparent for the scattered light. The laser beam can be incident from the side of the sample stage 503 adjacent to the first Raman spectrometer 460, and the second Raman spectrometer 470 can receive the Raman scattered light from the other side of the sample stage 503, and vice versa.

The scattered lights can pass through the same optical paths of the first and second incident laser beams. The first dichroic beam splitter 430 is disposed on both the optical path of the first incident laser beam and the optical path of the first scattered lights. The first dichroic beam splitter 430 is configured to reflect the first incident laser beam to the sample 501 and split the first Raman scattered light from the first Rayleigh scattered light in the first scattered lights. The first Raman spectrometer 460 is disposed on the optical path of the first Raman scattered light split by the first dichroic beam splitter 430 to obtain a Raman spectrum of the sample 501. The second dichroic beam splitter 440 is disposed on both the optical path of the second incident laser beam and the optical path of the second scattered lights. The second dichroic beam splitter 440 is configured to reflect the second incident laser beam to the sample 501 and split the second Raman scattered light from the second Rayleigh scattered light. The second Raman spectrometer 470 is disposed on the optical path of the second Raman scattered light split by the second dichroic beam splitter 440 to obtain a Raman spectrum of the sample 501. The second prism 480 is disposed on both the optical path of the first Rayleigh scattered light split by the first dichroic beam splitter 430 and the second Rayleigh scattered light split by the second dichroic beam splitter 440.

In an embodiment, the first Raman scattered light split by the first dichroic beam splitter 430 is coupled into an optical fiber through a coupler and transmitted to the first Raman spectrometer 460 through the optical fiber. The second Raman scattered light split by the second dichroic beam splitter 440 is coupled into another optical fiber by another coupler and transmitted to the second Raman spectrometer 470 through the optical fiber. A transmissive optical path structure is achieved by the first dichroic beam splitter 430 and the second dichroic beam splitter 440 such that Raman scattered lights are transmitted to the first Raman spectrometer 460 and the second Raman spectrometer 470.

The first Rayleigh scattered light and the second Rayleigh scattered light transmit in the optical paths back to the first prism 420 and the second prism 480. The second prism 480 can further split the Rayleigh scattered light into two Rayleigh scattered light beams. The confocal detecting unit 490 is disposed on the optical path of one of the two Rayleigh scattered light beams. In an embodiment, the tip-enhanced Raman spectroscope system 400 further includes a first focusing lens 910 and a charge coupled device (CCD) 920. The first focusing lens 910 is disposed on the optical path of another of the two Rayleigh scattered light beams. The Rayleigh scattered light beam converged by the first focusing lens 910 enters to the charge coupled device 920. Based on the differential confocal principle, the image of the sample can be compensated by a phase difference to obtain a high resolution image of the sample, so that the apex of the scanning probe 10 can be precisely moved to the focus. Therefore, the tip-enhanced Raman spectroscope system 400 can be used not only to measure the composition of the sample 501, but also to analyze the surface topology of the sample 501. Moreover, the spatial resolution can be improved by the optical path design of the tip-enhanced Raman spectroscope system 400. The Raman scattering can be enhanced by the scanning probe 10. The elementary excitation enhanced by the scanning probe 10 increases the electromagnetic field of the surface of the sample in the vicinity of the apex 102, thereby enhancing the Raman scattering signal of the sample 501 to achieve a high spectral resolution of the Raman spectrum.

In an embodiment, the tip-enhanced Raman spectroscope system 400 further includes a first reflecting mirror 930 and a second reflecting mirror 940. The first reflecting mirror 930 is disposed between the laser emitting unit 410 and the first prism 420 to change the direction of the optical path of the incident laser beam, and reduce the overall volume of the tip-enhanced Raman spectroscope system 400. The second reflecting mirror 940 is disposed between the first prism 420 and the second dichroic beam splitter 440 to change the direction of the optical path of the second incident laser beam, and reduce the overall volume of the tip-enhanced Raman spectroscope system 400.

The first reflecting mirror 930 can change the direction of the optical path of the incident laser beam, thereby changing the optical paths in the tip-enhanced Raman spectroscope system 400, and reducing the volume that the optical paths take, so that the tip-enhanced Raman spectroscope system 400 can be more portable and convenient to carry.

The second reflecting mirror 940 can change the direction of the optical path of the incident laser beam, thereby changing the optical paths in the tip-enhanced Raman spectroscope system 400, and reducing the volume that the optical paths take, so that the tip-enhanced Raman spectroscope system 400 can be more portable and convenient to carry.

In an embodiment, the laser emitting unit 410 includes a plurality of laser generators 401, a plurality of third collimating beam expanders 402, a plurality of apertures 403, a plurality of radial polarized light converters 404, a plurality of dichroic mirrors 405, and a polarizing beam splitter 406. The plurality of laser generators 401 are configured to emit a plurality of laser beams. Each of the third collimating beam expanders 402 is disposed on an optical path of the laser beam emitted by each of the laser generators 401. Each of the apertures 403 is disposed on the optical path of the laser beam after the third collimating beam expander 402. Each of the radial polarized light converters 404 is disposed on the optical path of the laser beam after the aperture 403. Each of the dichroic mirrors 405 is disposed on the optical path of the laser beam after the radial polarized light converter 404. The plurality of laser beams are recombined into a single laser beam through the plurality of dichroic mirrors 405. The polarizing beam splitter 406 is disposed on the optical path of the recombined laser beam after the plurality of dichroic mirrors 405.

The plurality of the laser generators 401 can be single frequency lasers with different wavelengths such as 532 nm, 633 nm, or 488 nm, which can realize a multi-wavelength Raman scattering spectroscopy detection. The laser beam emitted from each of the laser generators 401 is coupled into the optical fiber via a coupler, and transmitted to the third collimating beam expander 402 which maintains a collimation of the laser beam between the laser cavity and the optical lens. The aperture 403 is disposed after the third collimating beam expander 402. The numerical aperture of the optical fiber and the numerical aperture of the third collimating beam expander 402 may be different, inducing a lot of surrounding lights entering to the optical path of the system 400, which may affect the detection of the scattered light signals of the sample 501. The aperture 403 can blocking the surrounding lights out from the tip-enhanced Raman spectroscope system 400, reducing the influence of surrounding lights on the detection of Raman scattered light and Rayleigh scattered light, and improving the detection efficiency.

The radial polarized light converter 404 is disposed on the optical path of the laser beam after the aperture 403 to change the polarization state of the incident laser beam into a radially polarized laser beam, which can form a stronger longitudinal light field at the focus.

The polarized light with its electric field along the plane of incidence is denoted p-polarized, while the polarized light whose electric field is normal to the plane of incidence is denoted s-polarized. In an embodiment, the s-polarized light of the incident laser beam is filtered by the polarizing beam splitter 406, and the p-polarized light passes through the reflecting mirror 930, the beam splitter 420, the first dichroic beam splitter 430, and enters the first objective lens 502; and passes through the reflecting mirror 930, the beam splitter 420, the second reflecting mirror 940, the second dichroic beam splitter 440, and enters the second objective lens 503. The p-polarized light completely passes the polarizing beam splitter 406, and the s-polarized light is reflected at an angle by the polarizing beam splitter 406. The polarizing beam splitter 406 is composed by a pair of high precision right angle prisms, wherein the oblique surface of one prism is plated with a polarizing film.

In an embodiment, the first dichroic beam splitter 430 and the second dichroic beam splitter 440 are dichroic mirrors. The first dichroic beam splitter 430 and the second dichroic beam splitter 440 are almost completely transparent to the Raman scattered light, and almost completely non-transparent to the Rayleigh scattered light. Accordingly, the scattered light of the sample 501 can be separated into the Raman scattered light and the Rayleigh scattered light by the first dichroic beam splitter 430 and the second dichroic beam splitter 440. The Rayleigh scattered lights reflected by the first dichroic beam splitter 430 and the second dichroic beam splitter 440 enter the photomultiplier 904 which is capable of detecting the intensity of the light. The Raman scattered lights enter the first detector 604 and the second detector 704 for Raman spectroscopy detection. In an embodiment, the first dichroic beam splitter 430 and the second dichroic beam splitter 440 can be a narrowband single notch filter, which is capable of separating the Raman scattered light and the Rayleigh scattered light. The first detector 604 and the second detector 704 can be detectors, oscilloscopes, spectrometers, and so on.

In an embodiment, the laser excitation unit 450 further includes a first objective lens 502 and a second objective lens 503. The first objective lens 502 is disposed between the first dichroic beam splitter 430 and the sample 501 to focus the incident laser beam on the surface of the sample 501. The second objective lens 503 is disposed between the second dichroic beam splitter 440 and the sample 501 to focus the incident laser beam on the surface of the sample 501. The first objective lens 502 and the second objective lens 503 are high numerical aperture objective lenses, such as the Mitutoyo® M PLAN APO HR telephoto objective lens or the Olympus® LMPLFLN 100 telephoto objective lens. The high numerical aperture objective laser in the excitation unit 450 and the radially polarized laser beam can produce a high quality longitudinal light-field in a micro-area.

In an embodiment, the first Raman spectrometer 460 includes a second focusing lens 601, a first collimating beam expander 602, a third focusing lens 603, and a first detector 604. The second focusing lens 601 is disposed on the optical path of the first Raman scattered light split by the first dichroic beam splitter 430. The first Raman scattered light focused by the second focusing lens 601 enters the optical fiber. The first collimating beam expander 602 is disposed on the optical path of the first Raman scattered light transmitted through the optical fiber. The third focusing lens 603 is disposed on the optical path of the first Raman scattered light after the first collimating beam expander 602. The first detector 604 is disposed on the optical path of the first Raman scattered light focused by the third focusing lens 603 to have a Raman spectroscopy detection of the sample 501. The second focusing lens 601 and the third focusing lens 603 can compensate for the shortage of the light amount, and can focus the light. The second focusing lens 601 and the third focusing lens 603 are correspondingly selected according to the size of the numerical aperture of the first objective lens 502.

In an embodiment, the second Raman spectrometer 470 includes a fourth focusing lens 701, a second collimating beam expander 702, a fifth focusing lens 703, and a second detector 704. The fourth focusing lens 701 is disposed on the optical path of the second Raman scattered light split by the second dichroic beam splitter 440. The second Raman scattered light focused by the fourth focusing lens 701 enters the optical fiber. The second collimating beam expander 702 is disposed on an optical path of the second Raman scattered light transmitted through the optical fiber. The fifth focusing lens 703 is disposed on the optical path of the second Raman scattered light after the second collimating beam expander 702. The second detector 704 is disposed on the optical path of the second Raman scattered light focused by the fifth focusing lens 703 to have a Raman spectroscopy detection of the sample 501. The fourth focusing lens 701 and the fifth focusing lens 703 can compensate for the shortage of the light amount, and can focus the light. The fourth focusing lens 701 and the fifth focusing lens 703 are correspondingly selected according to the size of the numerical aperture of the second objective lens 503.

In an embodiment, the confocal detecting unit 490 includes a third prism 901, two sixth focusing lenses 902, two pinhole apertures 903, and two photomultipliers 904. The third prism 901 is disposed on the optical path of the Rayleigh scattered light after the second prism 480 and is different from the optical path of the Rayleigh scattered light path that enters to the first focusing lens 910. The two sixth focusing lenses 902 are respectively disposed on the two optical paths of the Rayleigh scattered light split by the third prism 901. The two pinhole apertures 903 are respectively disposed on the two optical paths of the Rayleigh scattered lights after the two sixth focusing lenses 902. The two photomultipliers 904 are respectively disposed on the two optical paths of the Rayleigh scattered lights after the two pinhole apertures 903 to detect the Rayleigh scattered lights excited by the sample 501.

The third prism 901 is a beam splitter. The first Rayleigh scattered light and the second Rayleigh scattered light respectively split by the first dichroic beam splitter 430 and the second dichroic beam splitter 440 are transmitted along the original optical paths back to the first prism 420 and the second prism 480, and then split by the third prism 901. The two Rayleigh scattered lights split by the third prism 901 respectively enter the two photomultiplier 904. The two photomultiplier 904 are equidistant positioned which can be perform a differential detection between the two Rayleigh scattered lights.

In an embodiment, the tip-enhanced Raman spectroscope system 400 further includes a data acquiring device, a sample stage controller, an objective actuator controller, a mounting bracket, and a computer. The sample stage controller and the objective actuator controller collectively control the relative positions of the first objective lens 502, the second objective lens 503, and the sample 501. The sample stage controller is capable of controlling the sample stage to move in a nanoscale precision thereby moving the apex 102 of the scanning probe 10 to the center of the focus. The computer is respectively connected to the data acquiring device, the sample stage controller, and the objective actuator controller. The data acquiring device can simultaneously collect the weak voltage signals output by the two photomultipliers 904.

Figure 27:
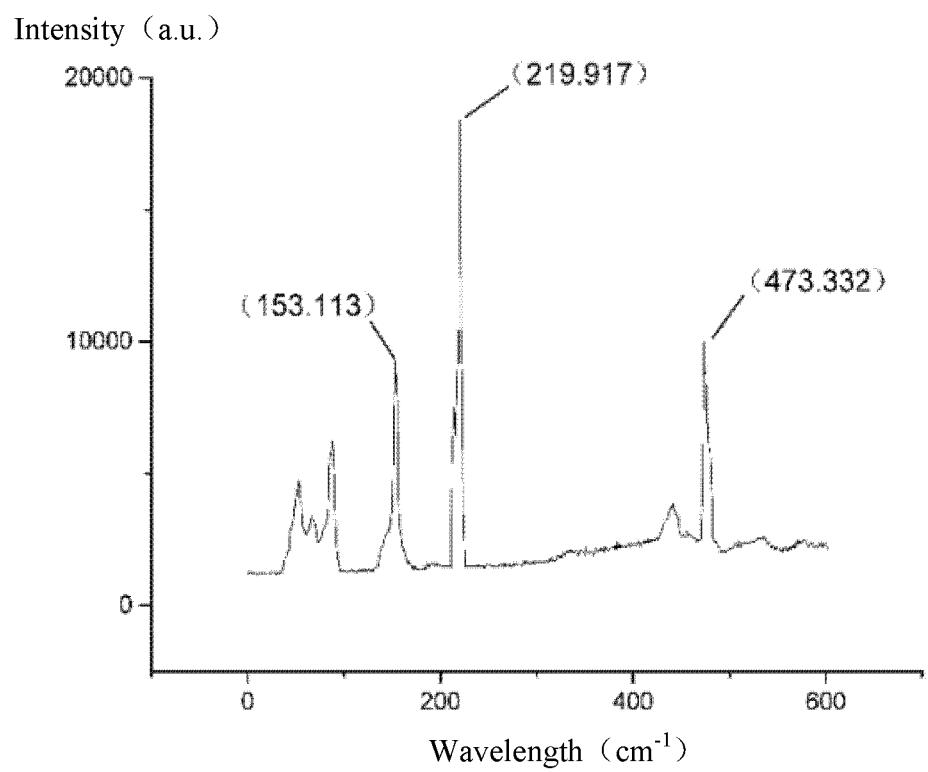
FIG. 27 shows a Raman spectrum of sulfur obtained by an embodiment of the tip-enhanced Raman spectroscope system.
Figure 28:
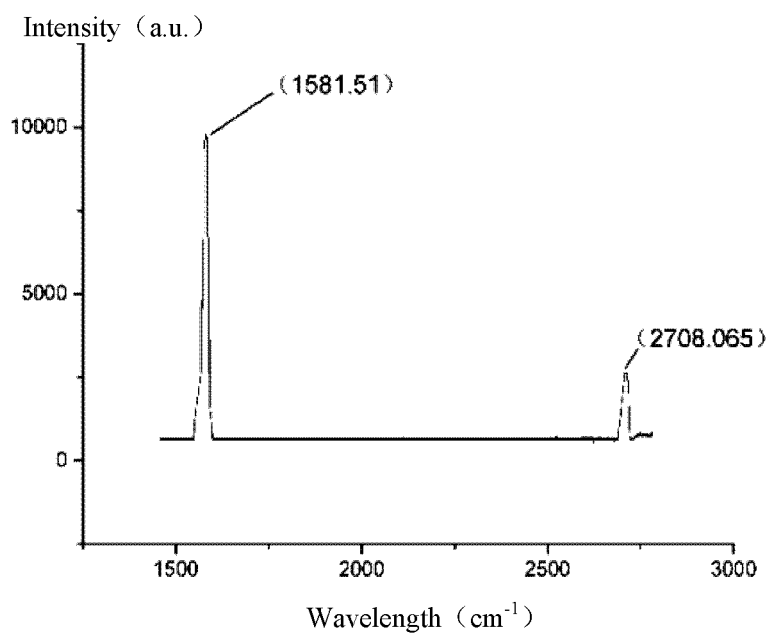
FIG. 28 shows a Raman spectrum of single-wall carbon nanotubes obtained by an embodiment of the tip-enhanced Raman spectroscope system.

Referring to FIG. 27 and FIG. 28, the characteristic peaks of 153 $cm^{-1}$, 219 $cm^{-1}$ and 473 $cm^{-1}$ of sulfur (FIG. 27) and the characteristic peaks of 158 $cm^{-1}$ and 2708 $cm^{-1}$ of carbon nanotubes (FIG. 28) were detected by the tip-enhanced Raman spectroscope system 400. The tip-enhanced Raman spectroscope system 400 forms a high resolution observation field, which can reach 8 million pixels to 10 million pixels. A spatial resolution of the tip-enhanced Raman spectroscope system 400 is less than 80 nm, wherein the x direction is less than 80 nm, the z direction is less than 0.05 nm, and the Raman spectral resolution is about 1 $cm^{-1}$ to about 2 $cm^{-1}$.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A scanning probe comprising:
   a base; and
   a micro-tip disposed on an end of the base,
   wherein at least a section of the micro-tip comprises a lateral surface with a concavely curved generatrix; and the micro-tip comprises diameter-changing sections, and the micro-tip comprises a converged lateral tip, a converged lateral edge, or a combination thereof disposed between the diameter-changing sections.

2. The scanning probe of claim 1, wherein the diameter-changing sections comprises a first diameter-changing section, a second diameter-changing section, and a distal section.

3. The scanning probe of claim 2, wherein two opposite ends of the second diameter-changing section respectively connect the first diameter-changing section and the distal section.

4. The scanning probe of claim 3, wherein the first diameter-changing section is adjacent to the base, and the second diameter-changing section is adjacent to the distal section.

5. The scanning probe of claim 2, wherein the distal section has a ball shape or an ellipsoid shape.

6. The scanning probe of claim 1, wherein the lateral surface of the micro-tip further comprises one or more recesses or protrusions.

7. The scanning probe of claim 1, wherein the converged lateral tip divides the micro-tip into the diameter-changing sections.

8. The scanning probe of claim 1, wherein each of the diameter-changing sections has a diameter decreasing and then increasing gradually in a length direction from one end to an opposite end.

9. The scanning probe of claim 1, wherein the micro-tip comprises an apex located at a most distal end of the scanning probe.

10. The scanning probe of claim 9, wherein a diameter of the apex is in a range from about 1 nm to about 5 nm, and a length of the micro-tip is in a range from about 1 μm to about 500 μm.

* * * * *